United States Patent
Tak et al.

(10) Patent No.: US 10,735,420 B2
(45) Date of Patent: Aug. 4, 2020

(54) COMBINED USER AUTHENTICATION AND DEVICE/APPLICATION INTEGRITY CHECK

(71) Applicants: Markus Tak, Birkenau (DE); Tan Sarihan, Potomac, MD (US)

(72) Inventors: Markus Tak, Birkenau (DE); Tan Sarihan, Potomac, MD (US)

(73) Assignee: KOBIL Systems GmbH, Worms (DE)

( * ) Notice: Subject to any disclaimer, the term of this patent is extended or adjusted under 35 U.S.C. 154(b) by 0 days.

(21) Appl. No.: 16/290,640

(22) Filed: Mar. 1, 2019

(65) Prior Publication Data

US 2019/0199723 A1    Jun. 27, 2019

Related U.S. Application Data

(63) Continuation of application No. PCT/EP2016/070579, filed on Sep. 1, 2016.

(51) Int. Cl.
*H04L 29/06* (2006.01)
*G06F 21/50* (2013.01)
*G06F 21/57* (2013.01)

(52) U.S. Cl.
CPC .......... *H04L 63/0884* (2013.01); *G06F 21/50* (2013.01); *G06F 21/57* (2013.01);
(Continued)

(58) Field of Classification Search
CPC ............. H04L 63/0884; H04L 63/0815; H04L 63/0807; H04L 63/0892; H04L 63/08; G06F 21/31; G06F 21/44
See application file for complete search history.

(56) References Cited

U.S. PATENT DOCUMENTS 7,076,558 B1 * 7/2006 Dunn ................... G06F 21/6218
709/225
7,784,092 B2 * 8/2010 Pearson .............. H04L 63/0815
726/12
(Continued)

FOREIGN PATENT DOCUMENTS

WO    WO 2011/091313 A1    7/2011

OTHER PUBLICATIONS

Samikura et al., OpenID Connect Core 1.0 incorporating errata set 1, Nov. 8, 2014, 82 pages.
(Continued)

*Primary Examiner* — Hosuk Song
(74) *Attorney, Agent, or Firm* — Reinhart Boerner Van Deuren P.C.

(57) ABSTRACT

A method is disclosed in which an authentication request is received related to authentication of a user of an electronic device towards a server of a service provider. Integrity of the electronic device and/or of an integrity of at least one application of the electronic device is checked. Authentication of the user of the electronic device is performed. Authentication information is returned towards the server of the service provider. A part of the authentication information is indicative of the user having been authenticated by the authentication, and a part of the authentication information represents that the electronic device and/or the at least one application has/have been considered integer by the checking. Further methods and related apparatuses, computer programs and a system are disclosed.

20 Claims, 8 Drawing Sheets

(52) U.S. Cl.
CPC ...... *H04L 63/0807* (2013.01); *H04L 63/0815* (2013.01); *H04L 63/0838* (2013.01); *H04L 63/0892* (2013.01); *G06F 2221/033* (2013.01); *G06F 2221/034* (2013.01)

(56) References Cited

U.S. PATENT DOCUMENTS

| | | |
|---|---|---|
| 8,327,131 B1 | 12/2012 | Hardjono et al. |
| 8,353,007 B2 * | 1/2013 | Gordon ................ H04W 12/06 726/2 |
| 8,943,552 B2 * | 1/2015 | McCann ................ H04L 63/08 726/4 |
| 8,984,588 B2 * | 3/2015 | Otranen ................ H04L 63/08 726/4 |
| 9,015,819 B2 * | 4/2015 | Zhang ................ H04L 63/0815 713/155 |
| 9,027,089 B2 * | 5/2015 | Cen ........................ H04L 63/08 709/227 |
| 9,300,653 B1 | 3/2016 | Dufel et al. |
| 2014/0007198 A1 | 1/2014 | Durbha et al. |

OTHER PUBLICATIONS

D. Hardt, Internet Engineering Task Force (IETF), Request for Comments: 6749, The OAuth 2.0 Authorization Framework, Oct. 2012, 76 pages.
Wikipedia, SAML 2.0 (Security Assertion Markup Language 2.0), 22 pages, page last modified on May 3, 2016.
OASIS, Bindings for the OASIS Security Assertion Markup Language (SAML) V2.0, Oasis Standard, 46 pages, Mar. 15, 2005.
OASIS, Assertions and Protocols for the OASIS Security Assertion Markup Language (SAML) V2.0, Oasis Standard, 86 pages, Mar. 15, 2005.
Leicher et al., Implementation of a Trusted Ticket System, SEC 2009, IFIP AICT 297, pp. 152-163, May 18, 2009.

* cited by examiner

COMBINED USER AUTHENTICATION AND DEVICE/APPLICATION INTEGRITY CHECK

CROSS-REFERENCE TO RELATED PATENT APPLICATION

This patent application is a continuation of PCT/EP2016/070579, filed Sep. 1, 2016, the entire teachings and disclosure of which are incorporated herein by reference thereto.

FIELD OF THE DISCLOSURE

The invention relates to the field of authentication, and in particular to authentication of a user requesting a service.

BACKGROUND

Nowadays, different approaches exist to authenticate a user that requests a service. As an example, the SAML (SAML: Security Assertion Markup Language) protocol authenticates a user that requests a service from a service provider. According to the SAML protocol, the possibility is offered to exchange security-associated information between two entities for providing authentication for the one entity seeking authentication.

According to the SAML protocol, the service may be requested e.g. by a terminal. Upon receiving the service request, a server of the service provider sends an authentication request to an authentication server, which authenticates the user based on an authentication procedure, e.g. information provided or cause to be provided to the authentication server such as a password, a one-time password, a certificate, a biometric representation of the user, etc. In case the authentication was successful, a response is returned to the server of the service provider. Thus, the user is authenticated and the requested service can be provided to the user.

However, by performing an authentication of the user solely, there is room for fraudulent usage of the service. For instance, authentication credentials, which may be used for identifying the user, may be copied by an unauthorized third person, in particular if an application that is used to provide the authentication credentials has been compromised. The unauthorized third person may spoof the authentication server to believe that the unauthorized third person is the eligible user.

Further, another possibility of fraudulent usage of a services to modify the electronic device and/or an application that is used by the user to access/use the requested service. In this way, although the user may be entitled to use the service, the modification of the application may cause the service to be used in an unexpected or even criminal way to the disadvantage of the user and/or service provider.

SUMMARY OF SOME EXAMPLE EMBODIMENTS OF THE INVENTION

The drawback of prior art approaches for authenticating a user requesting a service is that the checking if the requested service may be provided is limited to authentication of the user. This still holds the risk of fraudulent usage, in particular since the integrity of the electronic device and/or of software that is used by a user to access/use the requested service is not checked.

It is thus inter alia an object of the present invention to provide a solution in which authentication with improved security can be provided.

According to a first exemplary aspect of the invention, a method is disclosed that comprises:
- receiving an authentication request related to authentication of a user of an electronic device towards a server of a service provider;
- checking or causing checking of an integrity of the electronic device and/or of an integrity of at least one application of the electronic device;
- performing or causing authentication of the user of the electronic device; and
- returning or causing returning of authentication information towards the server of the service provider,
- wherein at least a part of the authentication information and/or the returning of at least a part of the authentication information is indicative of the user having been authenticated by the authentication and
- wherein at least a part of the authentication information and/or the returning of at least a part of the authentication information represents that the electronic device and/or the at least one application has/have been considered integer by the checking.

The method according to the first aspect of the invention may for instance be performed and/or controlled by at least one apparatus (e.g. one apparatus), e.g. a server or a server cloud comprising at least two servers. The at least one apparatus performing and/or controlling the method according to the first aspect of the invention will be denoted as the at least one apparatus according to the first aspect of the invention in the following.

The at least one apparatus according to the first aspect of the invention may for instance be an identity provider (IdP) server, which may instance be used for performing and/or controlling the method according to the first aspect of the invention. This identity provider server may in particular enrich a statement that the user of the electronic device has been authenticated by the additional statement that the electronic device and/or at least one application of the electronic device are integer.

The at least one apparatus according to the first aspect of the invention may for instance at least act towards the server of the service provider like a SAML (Security Assertion Markup Language) authority. SAML can be used for exchanging authentication and authorization data between security domains. SAML is an XML-based protocol that uses security tokens containing assertions to pass information about a principal (usually an end user) between a SAML authority, that is, an identity provider, and a SAML consumer, that is, a service provider. SAML enables web-based authentication and authorization scenarios including cross-domain single sign-on (SSO), which helps reduce the administrative overhead of distributing multiple authentication tokens to the user. An example of SAML is SAML 2.0. Instead of SAML, other authentication frameworks may be used by the at least one apparatus according to the first aspect of the invention, such as Oauth (e.g. Oauth 2.0) or OpenID.

The at least one application may for instance be installed on the electronic device. One of the at least one application may for instance be a browser application or have browsing functionality, and/or an application that allows interaction with one or more services of the service provider. Therein, a service provider is understood as an entity that offers one or more services, which may however require authentication before access to the one or more services is granted. The services may be publicly accessible (after authentication), or may be non-public. The one of the at least one application, or another one of the at least one application, may for instance be configured to interact with a server to allow checking an integrity of the electronic device and/or of the at least one application of the electronic device.

The authentication request may for instance stem or be issued from the server of the service provider, which may for instance send the authentication request upon receiving a request (e.g. a (service) request for a service provided by the service provider), which request may for instance stem from the electronic device. The authentication request may for instance comprise an address of the server of the service provider (e.g. serving as a return address for the response to the authentication request). Additionally or alternatively, the authentication request may contain signed information (e.g. an identifier of the service requested) that can be checked by the at least one apparatus according to the first aspect of the invention, e.g. based on an established trust relationship between the server of the service provider and the at least one apparatus according to the first aspect of the invention, wherein this trust relationship may for instance at least be based on the exchange of certificates and/or public cryptographic keys). The authentication request may for instance obey a format of an authentication or authorization standard, such as for instance SAML (e.g. SAML 2.0), Oauth (e.g. Oauth 2.0) or OpenID.

The authentication request may for instance be received by the apparatus according to the first aspect of the invention directly from the server of the service provider or be received from the electronic device, e.g. in the context of a re-direct operation caused by the server of the service provider (e.g. the authentication request may be contained in an HTTP Redirect URL provided by the server of the service provider to the electronic device, e.g. encoded into a Location header). For instance, the server of the service provider may redirect a service request received from the electronic device via the electronic device towards the apparatus according to the first aspect of the invention (e.g. the identity provider server). Therein, in the re-direct operation, (e.g. signed) information on the identity of the service for which authentication is required and/or address information of the server of the service provider (e.g. a callback-URL, e.g. to enable the at least one apparatus according to the first aspect of the invention to return information (e.g. the authentication information or a part thereof) to the server of the service provider) may for instance be provided (e.g. as a parameter) to the at least one apparatus according to the first aspect of the invention. The re-directed information sent from the server of the service provider to the at least one apparatus according to the first aspect of the invention via the electronic device may then for instance be considered as the authentication request.

Alternatively, the authentication request may for instance be received by the apparatus according to the first aspect of the invention from the electronic device in the context of a form-based HTTP POST operation. For instance, the server of the service provider may provide an (e.g. XHTML) form targeted at the apparatus according to the first aspect of the invention to the electronic device, which then submits the form or at least a part thereof in an HTTP POST to the apparatus according to the first aspect of the invention. The submission of the form or at least a part thereof by the electronic device may for instance be triggered by an instruction (e.g. a JavaScript instruction) to submit the form, which instruction is for instance received by the electronic device together with the form or as a part thereof.

The checking or causing checking of an integrity of the electronic device and/or of an integrity of the at least one application of the electronic device may for instance be performed and/or controlled in response to receiving the authentication request.

The checking of the integrity of the electronic device and/or of the integrity of the at least one application may for instance comprise one or more of the following: a check of the integrity of the electronic device (e.g. if one or more pre-defined configurations and/or one or more pre-defined user rights of the electronic device have been changed, and/or if one or more pre-defined security-related characteristics are fulfilled (e.g. presence and/or actuality of anti-virus software, and/or no jailbreak having taken place, and/or absence of applications listed on a black-list), a check of the integrity of the at least one application (e.g. if a check sum or (e.g. signed) hash value of the at least one application corresponds to an expected value), a check of a binding (or association) between the electronic device and the at least one application (e.g. if one or more characteristics (e.g. a type and/or serial number and/or operation system version and/or fingerprint of the electronic device) match one or more characteristics of the at least one application (e.g. a version and/or serial number and/or checksum and/or hash value), a check of a version of the at least one application, a check of an update status of the at least one application. Which of these checks the checking of the integrity of the electronic device and/or of the integrity of the at least one application comprises may for instance be pre-defined. The checking of the integrity of the electronic device and/or of the integrity of the at least one application may for instance only be considered to yield a positive result if all of these pre-defined checks have yield a positive result. In example embodiments of the invention, only the integrity of the electronic device is checked or caused to be checked. In other example embodiments of the invention, only the integrity of the at least one application (e.g. of one application, or of more than one applications) is checked or caused to be checked. Therein, in particular, not all applications that are installed on the electronic device may be checked or caused to be checked. In example embodiments of the invention, the integrity of the electronic device and the integrity of the at least one application are checked or caused to be checked.

The checking of the integrity of the electronic device and/or of an integrity of the at least one application of the electronic device may for instance be based on information (e.g. so-called first information described below in further detail) that is associated with a check of the integrity of the electronic device and/or the integrity of at least one application of the electronic device that has been performed by an apparatus (e.g. a so-called SSMS) that is different from the at least one apparatus according to the first aspect of the invention. After the checking of the integrity of the electronic device and/or of the integrity of the at least one application of the electronic device, a response information being indicative of the result of the checking may for instance be received.

The performing or causing authentication of the user of the electronic device may for instance be performed and/or controlled in response to receiving the authentication request. The performing or causing authentication of the user of the electronic device may for instance only be performed if the checking of the integrity of the electronic device and/or of the integrity of the at least one application of the electronic device yielded a positive result. For instance, the checking may have failed, e.g. due to a timeout, or due to the electronic device and/or the at least one application having been considered not integer (e.g. at least one of the above-described one or more pre-defined checks has yield a negative result). In this case, there may thus be no need to perform and/or control additional actions such as performing or causing authentication of the user of the electronic device. After the authentication of the user of the electronic device, response information being indicative of the result of the authentication may for instance be received.

Alternatively, the checking or causing checking of the integrity of the electronic device and/or of the integrity of at least one application of the electronic device may for instance only be performed if the user has been found to be authenticated in the authentication.

In example embodiments of the invention, checking or causing checking of the integrity of the electronic device and/or of the integrity of at least one application of the electronic device may for instance be performed before performing or causing authentication of the user of the electronic device, or at least partially (or entirely) in parallel therewith, or after performing or causing authentication of the user of the electronic device.

The returning or causing returning of authentication information may for instance be performed by (e.g. directly) returning authentication information to the server of the service provider. For instance, a response information being indicative of the result of the authentication of the user may be received (e.g. from an authentication server, e.g. directly or via the electronic device). Upon receiving the response information, the authentication information may for instance be sent to the server of the service provider. An address of the server of the service provider to which the authentication information is returned (e.g. for directly returning the authentication information) may for instance be comprised in or provided together with the authentication request (e.g. as a callback-URL). The authentication information may for instance be returned to the server of the service provider by the apparatus according to the first aspect of the invention directly. Alternatively, the returning of the authentication information may for instance be caused by the apparatus according to the first aspect of the invention by using an HTTP redirect operation (in which the electronic device is for instance redirected back to the server of the service provider) or by using a form-based HTML POST operation (in which the electronic device is caused to submit an (e.g. XHTML) form targeted at the server of the service provider or at least a part thereof in an HTTP POST, wherein the form was comprised in a response received by the electronic device from the apparatus according to the first aspect of the invention). The submission of the form or at least a part thereof by the electronic device may for instance be triggered by an instruction (e.g. a JavaScript instruction) to submit the form, which instruction is for instance received by the electronic device together with the form or as a part thereof.

There may for instance be no returning of authentication information towards the server of the service provider in case that one or more of the following conditions hold: the user has not been not authenticated (e.g. authentication failed), the electronic device is not considered integer, the at least one application of the electronic device is not considered integer. For instance, instead of returning authentication information, in the aforementioned case an error message may be returned towards the server of the service provider, or no information may be returned at all to cause a time-out of the authentication request. The aforementioned error message may for instance be returned directly to the server of the service provider.

In example embodiments of the invention, information on an identity of the user may not be contained in and/or derivable from the authentication information. Alternatively, in other example embodiments of the invention, the authentication information comprises information on or allowing deriving an identity of the user.

At least a part of authentication information is indicative of the user having been authenticated by the authentication, and/or the returning of at least a part of the authentication information is indicative of the user having been authenticated by the authentication. For instance, in response to the authentication request, at least two types of response information may be received by the server of the service provider, wherein a first type of response information may be indicative that the user was authenticated, and a second type of response information may be indicative of the user not having been authenticated (e.g. because the user provided false credentials in the authentication). The at least a part of the authentication information (or even the entire authentication information) may for instance correspond to the first type of response information. Alternatively, in response to the authentication request, either no information or information that the user was authenticated is received, wherein this latter information may for instance represent the at least a part of the authentication information. The mere returning of this at least a part of the authentication information thus is indicative of the user having been authenticated.

Similarly, concerning the integrity checking, either at least a part of the authentication information or the returning of at least a part of the authentication information is indicative of the electronic device and/or the at least one application having been considered integer by the checking.

The at least a part of the authentication information which indicates (or the returning of which indicates) that the electronic device and/or the at least one application has/have been considered integer by the checking may for instance be the same at least a part of the authentication information which indicates (or the returning of which indicates) that the user has been authenticated by the authentication, or may be different therefrom. In the former case, where both parts of the authentication information are the same, thus the same information is indicative of the (checked) authentication of the user and the (checked) integrity of the electronic device and/or of the at least one application of the electronic device. There is then for instance only one information in the authentication information that indicates (or the returning of which indicates) that the user has been authenticated and that the electronic device and/or the at least one application of the electronic device have been found integer.

The authentication information may for instance comprise a status indicator that indicates if the user has been authenticated or not (e.g. a samlp:StatusCode in a response according to the SAML 2.0 standard). This status indicator may for instance represent both the at least a part of the authentication information which indicates (or the returning of which indicates) that the electronic device and/or the at least one application has/have been considered integer by the checking and the at least a part of the authentication information which indicates (or the returning of which indicates) that the user has been authenticated by the authentication. The authentication information may for instance additionally or alternatively comprise an authentication token, which may for instance only be present in the authentication information if the user has been authenticated (e.g. a RelayState parameter in a response according to the SAML 2.0 standard). The presence of this authentication token in the authentication information may for instance be indicative of the electronic device and/or the at least one application having been considered integer by the checking and be indicative of the user having been authenticated by the authentication.

E.g., in example embodiments of the present invention, the same mechanism and/or data format for providing information to the server of the service provider that the user has been authenticated is thus advantageously additionally used to convey information on the successful check of the integrity of the electronic device and/or used to convey information on the successful check of the integrity of the at least one application of the electronic device. The data format of the authentication information, e.g. as in the SAML, Oauth or OpenID standard, may thus not have to be changed, but the authentication information nevertheless (either implicitly or explicitly) conveys an additional information concerning the integrity of the electronic device and/or at least one application thereof. If checking of the integrity of the electronic device and/or of the at least one application of the electronic device fails, this may be indicated to the server of the service provider in the same way as if the authentication of the user had failed, e.g. by using the same error message towards the server of the service provider. Optionally, for instance a type of the error, e.g. representing that the integrity check failed, or that the authentication of the user failed, or both, may be returned or caused to be returned towards the server of the service provider. In this way, the server of the service provider needs to undergo no changes concerning the format of responses received in reaction to the authentication request, e.g. as compared to the format of the SAML, Oauth or OpenID standards.

Thus, compared to a (e.g. prior art) system where a server of a service provider sends an authentication request to an authentication server and receives at least a part of authentication information from the authentication server in response that indicates if the authentication was successful or not, according to example embodiments of the present invention, an apparatus according to the first aspect of the present invention is looped-in between the server of the service provider and the authentication server, receives the authentication request from the server of the service provider, performs or triggers checking of the integrity of the electronic device and/or of at least one application thereof, triggers authentication of the user of the electronic device by the authentication server and returns at least a part of authentication information, which is indicative of the authentication of the user by the authentication server having yield a positive result, back to the server of the service provider. In example embodiments of the present invention, the only changes with respect to the server of the service provider, to loop-in the at least one apparatus according to the first aspect of the invention, may be to change the address where the authentication request shall be directed to from the address of the authentication server to the address of the at least one apparatus according to the first aspect of the invention, and for instance, to establish a trust relationship between the server of the service provider and the at least one apparatus according to the first aspect of the invention, e.g. by storing certificates and/or public cryptographic keys of the respective other entity at the server of the service provider and the at least one apparatus according to the first aspect of the invention. In these example embodiments, the only changes with respect to the authentication server, to loop-in the at least one apparatus according to the first aspect of the invention, may be to establish a trust relationship between the authentication server and the at least one apparatus according to the first aspect of the invention, e.g. by storing certificates and/or public cryptographic keys of the respective other entity at the authentication server and the at least one apparatus according to the first aspect of the invention.

At least a part of the authentication information that is defined to indicate that the authentication was successful is only included in the authentication information (e.g. in the form of an authentication token) by the apparatus according to the first aspect of the invention or set to a value (e.g. in the form of a pre-defined value of a status indicator) that indicates that the authentication was successful, if also the checking of the integrity of the electronic device and/or of the integrity of the at least one application thereof yielded a positive result. Alternatively, the authentication information (e.g. as a whole) is for instance only returned to the server of the service provider by the apparatus according to the first aspect of the invention, if the checking of the integrity of the electronic device and/or of at least one application thereof yielded a positive result, or.

In this way, additionally an integrity check of the electronic device and/or an integrity check of the at least one application of the electronic device is provided, resulting in an increased level of security for the service provider.

In an exemplary embodiment, the method according to the first aspect of the present invention further comprises, prior to checking or causing checking, obtaining a first information. The obtained first information is used (or useable) for checking or causing checking of the integrity of the electronic device and/or of the integrity of the at least one application of the electronic device.

The first information may for instance be information issued by an apparatus (e.g. an SSMS (SSMS: Smart Security Management Server)) and may be associated with a check of the integrity of the electronic device and/or of the integrity of the at least one application of the electronic device that has been performed, e.g. by this apparatus (which may for instance be different from the at least one apparatus according to the first aspect of the invention). For instance, the first information may comprise information on a result of the validity check and/or information on a time when the validity check was performed. The first information may for instance be used as a reference to the integrity check. For instance, the first information may be presented (e.g. by the apparatus according to the first aspect of the invention) to the apparatus that issued the first information which apparatus may then, at least based on the first information, determine if the electronic device and/or of the at least one application of the electronic device had been found integer in the integrity check. The validity check may for instance be performed together with or as part of an authentication of the electronic device and/or of its user and/or of the at least one application of the electronic device towards the apparatus (e.g. the SSMS) that performs the validity check.

The first information may for instance only be issued by the apparatus if the electronic device and/or its user and/or the at least one application of the electronic device have been authenticated by the apparatus. The authentication of the user of the electronic device may for instance be based on a credential (e.g. a password (e.g. a PIN) or a biometric characteristic (e.g. a fingerprint) to be provided by the user. However, provision of the credential by the user may for instance be dispensed with to increase usability and user-friendliness of the authentication. Authentication of the electronic device and/or of the at least one application may for instance be based on a secret stored in the electronic device and/or the at least one application, wherein possession of the secret may for instance be proven by the electronic device and/or the at least one application by a challenge-response technique, to name but one example.

The first information may for instance have a pre-defined time-limited validity (e.g. of only a couple (e.g. 1, 3, 5 or 10) of minutes, hours or days), e.g. to ensure that the integrity check performed by the apparatus is not too outdated when it is referred to by the first information. The first information may for instance be an OTP (OTP: one-time password), e.g. a login OTP that is for instance included by the electronic device into a request for a service directed to the server of the service provider.

The obtaining of the first information may for instance comprise sending a request for the first information, e.g. to the electronic device. The obtaining may additionally or alternatively comprise receiving the first information, e.g. from the electronic device. For instance, the first information may be received together with and/or form part of the authentication request. The first information may for instance be used for checking or causing checking of the integrity of the electronic device and/or of the integrity of the at least one application of the electronic device.

The first information may for instance be at least a part of the authentication request.

The first information may for instance be received by the at least one apparatus according to the first aspect of the present invention prior to receiving the authentication request, or together with (e.g. within) the authentication request, or after receiving the authentication request.

The first information may for instance be obtained by the at least one apparatus according to the first aspect of the present invention without a request for this first information being sent or triggered by the at least one apparatus, e.g. in a passive manner, e.g. together with the authentication request. This example approach may be denoted as an "implicit" first information provision approach. To this end, the first information may for instance have been obtained by the electronic device from an apparatus (e.g. an SSMS as described above) before sending the service request to the server of the service provider. It may then for instance be included into the service request or transmitted together with the service request to the server of the service provider. The server of the service provider may then for instance include this first information into the authentication request destined to the at least one apparatus according to the first aspect of the invention (e.g. via a re-direct as described above). This may be advantageous since it may then not be required for an application of the electronic device (e.g. a browser, in particular a standard browser of a computer or mobile phone), which application issued the service request to the server of the service provider, to break out of a sandbox in which the application is running, in order to request the first information from another application of the electronic device, as will be described in further detail below. Such a breakout may however be required if the first information has to be requested (by the at least one apparatus according to the first aspect of the invention) from the electronic device after the authentication request has been received by the server of the service provider (and e.g. re-directed to the at least one apparatus according to the first aspect of the present invention).

Alternatively, the at least one apparatus according to the first aspect of the present invention may actively request the first information from the electronic device, e.g. in response to receiving the authentication request. This approach may be denoted as an "explicit" first information provision approach. This approach may for instance be advantageous since the first information may then for instance be more up-to-date than a first information that is already contained in the authentication request.

(E.g. only) in case the checking of the integrity of the electronic device and/or of the integrity of the at least one application of the electronic device yielded a positive result, the performing or causing authentication of the user of the electronic device may be performed and/or controlled.

In an exemplary embodiment of the method according to the first aspect of the present invention, the performing or causing authentication comprises sending or causing sending an authentication request towards an authentication server; and receiving response information, wherein at least a part of the response information is indicative of the user having been authenticated by the authentication server.

The authentication request sent or caused to be sent towards the authentication server by the apparatus according to the first aspect of the invention (and also denoted as "second authentication request" in the next paragraph) may for instance be the same or at least partially differ from the authentication request received by the apparatus according to the first aspect of the invention (and also denoted as "first authentication request" in the next paragraph).

The second authentication request may for instance be sent directly from the at least one apparatus according to the first aspect of the invention to the authentication server. Alternatively, the second authentication request may for instance be caused to be sent to the authentication server via a re-direct operation, e.g. by instructing the electronic device to direct the second authentication request to the authentication server (e.g. the second authentication request may be contained in an HTTP Redirect URL provided by the apparatus according to the first aspect of the invention to the electronic device, e.g. encoded into a Location header). An authentication request may thus for instance be re-directed twice: first from the server of the service provider to the at least one apparatus according to the first aspect of the invention (this authentication request may then be represented by the first authentication request), and second from this apparatus to the authentication server (this authentication request may then be represented by the second authentication request). Alternatively, the second authentication request may for instance be caused to be sent to the authentication server in the context of a form-based HTTP POST operation. For instance, the apparatus according to the first aspect of the invention may provide an (e.g. XHTML) form targeted at the authentication server to the electronic device, which then submits the form or at least a part thereof in an HTTP POST to the authentication server. The submission of the form or at least a part thereof by the electronic device may for instance be triggered by an instruction (e.g. a JavaScript instruction) to submit the form, which instruction is for instance received by the electronic device together with the form or as a part thereof.

The response information may for instance be received by the at least one apparatus that performs and/or controls the method according to the first aspect of the invention from the authentication server. Alternatively, the response information may for instance be received by the apparatus according to the first aspect of the invention from the electronic device in the context of an HTTP redirect operation (in which the electronic device is for instance caused by the authentication server to be redirected back to apparatus according to the first aspect of the invention) or in the context of a form-based HTML POST operation (in which the electronic device is caused to submit an (e.g. XHTML) form targeted at the apparatus according to the first aspect of the invention or at least a part thereof in an HTTP POST, wherein the form was comprised in a response received by the electronic device from the authentication server). The submission of the form or at least a part thereof by the electronic device may for instance be triggered by an instruction (e.g. a JavaScript instruction) to submit the form, which instruction is for instance received by the electronic device together with the form or as a part thereof.

Information from the user of the electronic device (e.g. a credential (such as e.g. a user name and a password or a biometric characteristic of the user, e.g. a fingerprint) may be needed by the authentication server for the authentication. This information may be retrieved by the authentication server from the electronic device directly. For instance, this information may be retrieved by the authentication server from the electronic device via an authentication web page that is presented to the electronic device. The electronic device may for instance have been re-directed to this authentication web page by the at least one apparatus according to the first aspect of the invention. Alternatively, this information may be retrieved by the authentication server from the electronic device via the at least one apparatus according to the first aspect of the invention. For instance, the at least one apparatus according to the first aspect of the invention may embed an authentication web page provided by the authentication server in its own web page and present the resulting web page to the electronic device. Information provided by the electronic device in response to this web page may then be provided by the at least one apparatus according to the first aspect of the invention to the authentication server.

The authentication request sent or caused to be sent towards the authentication server may for instance have at least some information (e.g. one or more attributes) in common with the authentication request received by the at least one apparatus according to the first aspect of the invention. This may be achieved by re-directing the received authentication request towards the authentication server by the at least one apparatus according to the first aspect of the invention, e.g. by adding information to and/or changing information in the received authentication request before causing re-direction thereof. For instance, in the authentication request sent or caused to be sent towards the authentication server, the return address of the at least one apparatus according to the first aspect of the invention may be included instead of or in addition to the address (e.g. return address) of the server of the service provider. Additionally or alternatively, in the authentication request sent or caused to be sent towards the authentication server, at least some information may be contained that is based on the trust relationship between the at least one apparatus according to the first aspect of the invention and the authentication server (e.g. by being signed in a way that it can be checked by the authentication server based on a certificate or public cryptographic key of the at least one apparatus according to the first aspect of the invention).

The response information may for instance be or comprise information indicative that user has been authenticated (e.g. that credentials provided by the user have been found to match data stored by the authentication server), e.g. in the form of an authentication token and/or a status indicator indicating that authentication was successful. Further, at least a part of the response information may for instance comprise information related to the identity of the user of the electronic device.

In an exemplary embodiment, the method according to the first aspect of the present invention further comprises relaying information related to the authentication of the user between the authentication server and the electronic device.

The relaying of information may for instance comprise forwarding information between the authentication server and the electronic device. This forwarded information may for instance be information requested by the authentication server related to the identity and/or the verification of the identity of the user of the electronic device, such as credentials to be provided by the user. As already explained above, the apparatus according to the first aspect of the invention may for instance embed an authentication web page provided by the authentication server in an own web page, present the resulting web page to the electronic device and forward information provided by the electronic device in response to this web page back to the authentication server.

In an exemplary embodiment of the method according to the first aspect of the present invention, in the authentication, one or more credentials are provided to the authentication server without being relayed via the at least one apparatus. The one or more credentials may for instance be entered by a user of the electronic device into a web page of the authentication server to which the electronic device has been directed (e.g. by the at least one apparatus according to the first aspect of the invention).

In an exemplary embodiment, the authentication of the user of the electronic device is performed based on information resulting from a previous authentication of the user and obtained from an authentication server that was involved in the previous authentication of the user.

For instance, the authentication of the user of the electronic device vis-à-vis an authentication server is performed or caused only once, e.g. in an initial enrollment or an initial authentication of the user (which may be after the initial enrollment). In response to a subsequent authentication request related to a user that has already been authenticated before, the apparatus according to the first aspect of the present invention may then for instance not cause authentication of the user by the authentication server, but may rely on the stored information obtained from the previous authentication of the user. This information is for instance obtained from an authentication server that was involved in the previous (e.g. initial) authentication of the user, and this information, or a representation thereof, may for instance be stored by the apparatus according to the first aspect of the invention. For instance, the authentication server may have issued, in the context of the previous (e.g. initial) authentication of the user, the information (e.g. an authentication token, which is for instance based on the trust relationship between the at least one apparatus according to the first aspect of the invention and the authentication server), which may then have been provided to the apparatus according to the first aspect of the invention (e.g. directly or via the electronic device). Based on this information (e.g. the authentication token) or a (e.g. stored) representation thereof, the apparatus according to the first aspect of the invention may then check, in case of a subsequent authentication request related to the same user, that the user has already been authenticated. The information (e.g. the authentication token or a representation thereof) may for instance be associated with a time-limited validity. The validity of the information (e.g. the authentication token) may for instance be checked by the apparatus according to the first aspect of the invention, and the user may for instance only be considered to be authenticated if the information is still valid at a time instant when the authentication request is received and/or at a time instant when the validity of the information is checked. It may thus be avoided to cause authentication of a user by the authentication server if the user has already been authenticated by the authentication server (and if this authentication is not considered to be outdated), which may considerably speed up the method according to the first aspect of the invention and/or may be considered more user-friendly, since the user does not have to provide his credentials to the authentication server each time an authentication request is received by the apparatus according to the first aspect of the invention.

If authentication of the user of the electronic device is performed by the at least one apparatus according to the first aspect of the invention based on information resulting from a previous authentication of the user (by the authentication server) and obtained from the authentication server that was involved in the previous authentication of the user, and if this authentication performed by the at least one apparatus according to the first aspect of the invention turns out that the user is considered to be authenticated, the at least one apparatus according to the first aspect of the invention may for instance generate an authentication token that represents that the user has been authenticated. This authentication token may then for instance be included in the authentication information that is returned or caused to be returned towards the server of the service provider. This authentication token may for instance be generated based on the trust relationship established between the server of the service provider and the at least one apparatus according to the first aspect of the invention, e.g. by signing the authentication token or at least a part thereof in a way that the signature can be checked (e.g. with respect to integrity and authenticity) by the server of the service provider, e.g. based on a certificate or public cryptographic key of the at least one apparatus according to the first aspect of the invention stored at or accessible to the server of the service provider.

In an exemplary embodiment of the method according to the first aspect of the present invention, the authentication information is returned to the server of the service provider (e.g. directly), or is sent to the electronic device to be returned to the server of the service provider (e.g. in response to a re-direct operation, where e.g. the address of the server of the service provider was provided to the electronic device as a parameter (e.g. a return address parameter)).

In an exemplary embodiment of the method according to the first aspect of the present invention, an initial enrollment may for instance be performed for the user of the electronic device and/or for at least one of the at least one application of the electronic device (e.g. the at least one application of the electronic device for which at least one application the integrity is checked in the method according to the first aspect of the invention). This initial enrollment may be at the at least one apparatus according to the first aspect of the invention and/or at an apparatus (e.g. an SSMS) that is to perform an integrity check for the electronic device and/or at least one application of the electronic device and issues information (such as the first information described above) on which the checking of the integrity of the electronic device and/or of at least one application of the electronic device as performed by the apparatus according to the first aspect of the invention is at least partially based. For instance, the initial enrollment may for instance comprise registering characteristics of the user of the electronic device and/or of the electronic device and/or of the at least one application of the electronic device. One or more of these characteristics may for instance be used for later checking the integrity of the electronic device and/or of the integrity of the at least one application. The initial enrollment, in particular an authentication for the initial enrollment, may for instance be based on e.g. (i) a certificate comprised by the electronic device and/or by the at least one application of the electronic device, (ii) a certificate being hard coded in the electronic device and/or in the at least one application of the electronic device, (iii) an authentication code, e.g. obtained after answering security questions, e.g. so-called 'know your customer' procedures, (iv) an authentication code, e.g. obtained by security hardware, for instance fingerprint sensors, SmartCard readers to name but a few examples.

For instance, if the apparatus according to the first aspect of the invention receives an authentication request related to a first-time authentication of a user, which authentication request does not comprise the first information, the apparatus according to the first aspect of the invention may enroll (and e.g. activate) the user of the electronic device and/or the at least one of the at least one application of the electronic device (e.g. the at least one application of the electronic device for which at least one application the integrity is checked in the method according to the first aspect of the invention) at the apparatus according to the first aspect of the invention and/or at the apparatus (e.g. an SSMS) that is to perform an integrity check for the electronic device and/or at least one application of the electronic device and issues information (such as the first information described above) on which the checking of the integrity of the electronic device and/or of at least one application of the electronic device as performed by the apparatus according to the first aspect of the invention is at least partially based. Subsequent authentication requests related to authentication of this user may then for instance have the first information included or provided therewith.

According to a second exemplary aspect of the invention, a method is disclosed, the method, performed by at least one (e.g. one) server of a service provider, comprising:
    receiving a service request from an electronic device;
    sending or causing sending of an authentication request to an apparatus to at least cause authentication of a user of the electronic device; and
    receiving authentication information,
    wherein at least a part of the authentication information is indicative of the user having been authenticated and
    wherein at least a part of the authentication information and/or the returning of at least a part of the authentication information represents that the electronic device and/or at least one application of the electronic device are considered integer by the apparatus.

The at least one server may for instance be a server cloud comprising at least two servers).

The authentication request may for instance be sent or caused to be sent in response to the service request. The authentication request may for instance correspond to the service request, or may contain different or additional information. The authentication request may for instance be a re-directed version of the service request with modified and/or added information. The apparatus to which the authentication request is sent or caused to be sent may for instance be the at least one apparatus according to the first aspect of the invention already described above, e.g. an identity provider server. The above description of characteristics and features of the method according to the first aspect of the present invention shall thus be considered to complement the present description of the method according to the second aspect of the invention. The authentication request may for instance be caused to be sent to the apparatus (according to the first aspect of the invention) via a re-direct operation, in which the electronic device is for instance instructed by the at least one server of the service provider to direct the authentication request to the apparatus (according to the first aspect of the invention), or via a form-based HTTP POST operation, in which the at least one server of the service provider may for instance provide an (e.g. XHTML) form targeted at the apparatus (according to the first aspect of the invention) to the electronic device, which then submits the form or at least a part thereof in an HTTP POST to the apparatus (according to the first aspect of the invention). The submission of the form or at least a part thereof by the electronic device may for instance be triggered by an instruction (e.g. a JavaScript instruction) to submit the form, which instruction is for instance received by the electronic device together with the form or as a part thereof.

The authentication information may for instance be received from the apparatus (according to the first aspect of the invention) (e.g. directly), or may be received from the electronic device (which may for instance have received the authentication information from the apparatus (according to the first aspect of the invention)), for instance in the context of a re-direct operation or a form-based HTTP POST operation, in particular with related submission trigger as described above.

The at least one server of the service provider may thus in particular be configured to send or cause sending of the authentication request to the apparatus (according to the first aspect of the invention), instead of sending or causing sending of the authentication request to an authentication server, e.g. since it is known to the service provider that the authentication information received in response to the authentication request (or the returning of this authentication information) then does not only represent that the user has been authenticated, but also that the electronic device and/or the at least one application of the electronic device (e.g. an application with which a service is requested from the at least one server of the service provider and/or used) has been checked for integrity and found to be integer accordingly.

In an exemplary embodiment, the method according to the second aspect of the invention further comprises checking the received authentication information to determine whether the user has been authenticated and whether the electronic device and/or the at least one application of the electronic device are considered integer by the apparatus, and granting access to a service requested by the service request only if it is determined that the user has been authenticated and that the electronic device and/or the at least one application of the electronic device are considered integer by the apparatus.

In an exemplary embodiment of the method according to the second aspect of the invention, the returning of the part of the authentication information that is indicative of the user having been authenticated represents that the electronic device and/or the at least one application of the electronic device is/are considered integer by the apparatus, the method further comprising checking the received authentication information to determine whether the user has been authenticated, and granting access to a service requested by the service request only if it is determined that the user has been authenticated.

In this embodiment, thus the mere returning of the part of the authentication information that is indicative of the user having been authenticated represents (e.g. without a need for further explicit information in the authentication information on the integrity of the electronic device and/or of the at least one application of the electronic device) that the electronic device and/or of the at least one application of the electronic device are integer. It is thus only necessary to check the received authentication information to determine whether the user has been authenticated, since a positive finding is this respect also represents that the electronic device and/or the at least one application are integer.

In an exemplary embodiment of the method according to the second aspect of the invention, wherein the apparatus to which the authentication request is sent or caused to be sent is an apparatus that is trusted by the at least one server.

In an exemplary embodiment of the method according to the second aspect of the invention, the method further comprises receiving first information, wherein the first information is useable by the apparatus for checking the integrity of the electronic device and/or of the at least one application of the electronic device.

The first information may for instance form part of the service request, or may be separate therefrom. Further characteristics of the first information, its generation and use have already been described above.

In an exemplary embodiment of the method according to the second aspect of the invention, the first information is contained in or provided together with the authentication request. In this way, the authentication request is made available to the apparatus.

According to a third exemplary aspect of the invention, a method is disclosed, the method, performed and/or controlled by an electronic device, comprising:
  sending a service request to a server of a service provider;
  providing information related to an integrity of the electronic device and/or to an integrity of at least one application of the electronic device; and
  providing information related to an identity of a user of the electronic device,
  wherein the information related to the integrity of the electronic device and/or to the integrity of the at least one application of the electronic device is provided in or together with the service request, or
  wherein the information related to the integrity of the electronic device and/or to the integrity of the at least one application of the electronic device is provided upon request after sending the service request.

The electronic device may e.g. be a terminal, a mobile phone, a laptop computer, a personal computer, a thin client, and/or a tablet. The method according to the third aspect of the invention may for instance be performed and/or controlled by at least one application of the electronic device. The at least one application on the integrity of which information is provided in the method according to the third aspect of the present invention may for instance be the same at least one application that performs and/or controls the method according to the third aspect of the present invention (e.g. a browser application, or a security-related application).

The above description of characteristics and features of the method according to the first and second aspects of the present invention shall be considered to complement the present description of the method according to the third aspect of the invention.

The information related to the integrity of the electronic device and/or of the at least one application of the electronic device may for instance be provided in response to a request from an apparatus that is different from the server of the service provider. The apparatus may in particular be the apparatus according to the first aspect of the invention. The information related to the integrity of the electronic device and/or of the at least one application may for instance be obtained by the electronic device from another apparatus (that is different from the server of the service provider and the apparatus from which the request is received) that checks the integrity of the electronic device and/or the integrity of the at least one application of the electronic device. The information related to the integrity of the electronic device and/or of the at least one application of the electronic device may for instance be the first information that has already been described above.

The information related to the integrity of the electronic device and/or to the integrity of the at least one application of the electronic device may for instance be provided to the server of a service provider.

The information related to an identity of a user of the electronic device may for instance be provided to an authentication server, or to an apparatus that forwards this information to an authentication server. This apparatus may for instance be different from the server of the service provider. This apparatus may for instance be the at least one apparatus according to the first exemplary aspect of the invention.

In an exemplary embodiment, the method according to the third aspect of the present invention further comprises, prior to sending of the service request, obtaining a first information useable for checking the integrity of the electronic device and/or the integrity of the at least one application of the electronic device; and including the obtained first information in the service request.

In an exemplary embodiment, the method according to the third aspect of the present invention further comprises using a service of the service provider as requested by the service request in case the service provider grants the service request.

The service may for instance be used via a communication connection between the electronic device and the server of the service provider, or another server (that may e.g. be indicated to the electronic device by the server of the service provider). The communication connection may for instance be a secure tunnel. A secure tunnel includes any tunnel for communicating information between network devices. The secure tunnel may for instance be encrypted. As used herein, a secure tunnel or secure tunnel connection is a mechanism that provides for the encapsulation of information, e.g. network packets or frames. A secure tunnel may be employed to take information, e.g. network packets or frames, from one entity and place (e.g. encapsulate) them inside frames from another entity. Examples of protocols for a secure tunnel connection include, but are not limited to IP tunneling, Layer 2 Tunneling Protocol (L2TP), Layer 2 Forwarding (L2F), VPNs, IP SECurity (IPSec), Point-to-Point Tunneling Protocol (PPTP), GRE, MBone, and SSL/TLS.

Furthermore, the following shall be disclosed for each of the above-described three aspects of the present invention, respectively:

(1) An apparatus configured to perform and/or control or comprising respective means for performing and/or controlling the method according to the respective aspect of the invention.

The means of the apparatus can be implemented in hardware and/or software. They may comprise for instance at least one processor for executing computer program code for performing the required function, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

(2) An apparatus comprising at least one processor and at least one memory including computer program code, the at least one memory and the computer program code configured to, with the at least one processor, cause an apparatus (e.g. the apparatus) at least to perform and/or control the method according to the respective aspect of the invention.

The above-disclosed apparatuses according to the respective aspect of the invention in item (1) or (2) may be a module or a component for a device, for example a chip. Alternatively, the disclosed apparatus according to the respective aspect of the invention may be a device, for instance a server or server cloud. The disclosed apparatus according to the respective aspect of the invention may comprise only the disclosed components (e.g. means, processor, memory) or may further comprise one or more additional components.

(3) A computer program when executed by a processor causing an apparatus (e.g. a server) to perform and/or control the actions of the method according to the respective aspect of the invention.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM) or hard disk of a computer, or be intended for distribution of the program, like an optical disc.

(4) A tangible, non-transitory computer-readable medium storing a computer program code, the computer program code when executed by a processor causing an apparatus to perform and/or control the method according to the respective aspect of the invention.

Furthermore, according to the present invention, a system is disclosed, comprising at least an apparatus according to the first exemplary aspect of the invention; an apparatus according to the second exemplary aspect of the invention; and an apparatus according to the third exemplary aspect of the invention. The system may further comprise a further apparatus, in particular an authentication server.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

Figure 1:
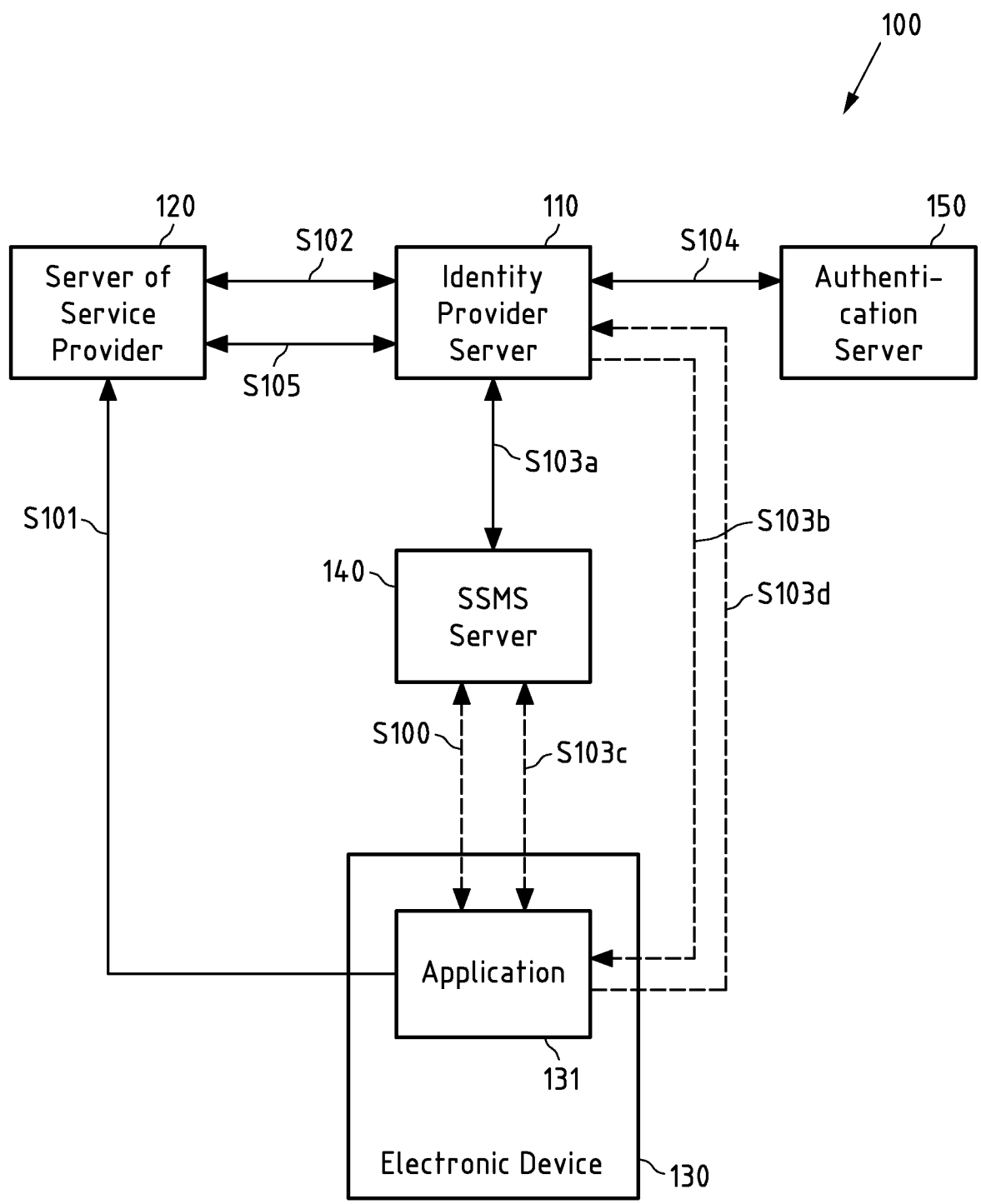
FIG. 1 shows a schematic block and interaction diagram of a system according to an exemplary embodiment of the invention.

FIG. 1 is a schematic block and interaction diagram of a system 100 according to an exemplary embodiment of the invention.

System 100 comprises an identity provider server 110, a server 120 of a service provider, an electronic device 130, e.g. in the form of a terminal, an SSMS 140 (SSMS: Smart Security Management Server) and an authentication server 150. Servers 110, 120, 140, 150 and the electronic device 130 are in communication via one or more communication networks, so that the interaction between the entities of the system 100 as illustrated in FIG. 1 is possible. This communication may be wire-bound or at least partially wireless. The functionality of identity provider server 110 and SSMS 140 may for instance also be provided by the same server.

The electronic device 130 comprises an application 131, which may for instance be installed on electronic device 130 and may e.g. be executed by using a processor and a memory. Application 131 may for instance be a security-related application, which may for instance be designed to communicate with SSMS 140, in particular to allow checking the integrity of application 131, and/or integrity of one or more further applications of electronic device 130 and/or integrity of electronic device 130 itself. Application 131 may for instance further be designed to allow using a service of the service provider via server 120. Application 131 may for instance be representative of more than one application (as will be discussed with reference to FIGS. 5a and 5b below).

Figure 2:
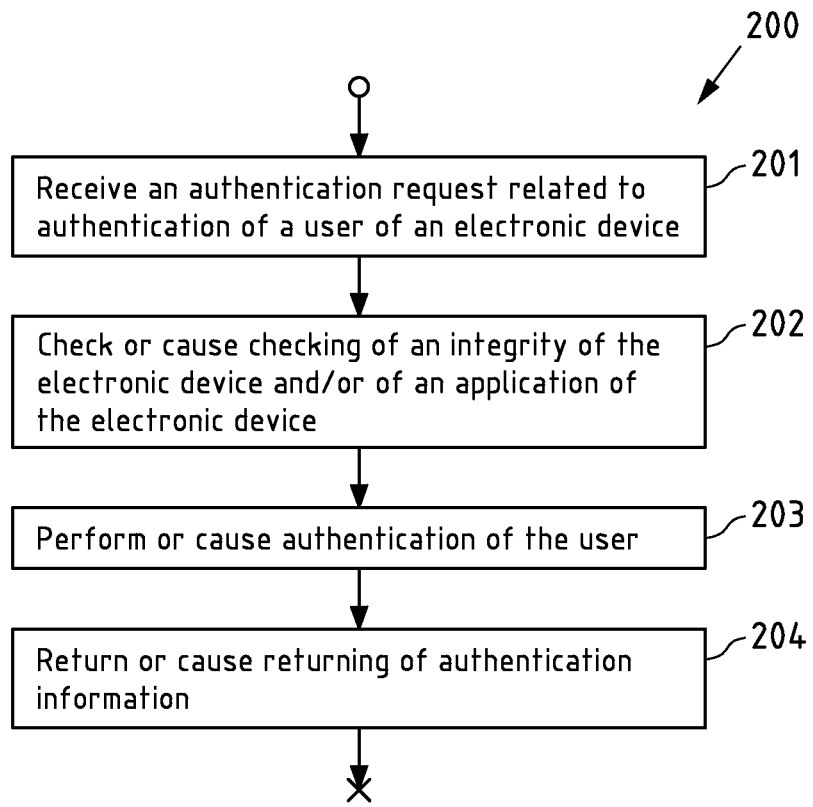
FIG. 2 shows a flowchart showing an example embodiment of a method according to the first exemplary aspect of the present invention, for instance performed by server 110 of FIG. 1.

The actions performed by identity provider server 110 are at least (see FIG. 2 for an according flow chart 200):

Identity provider server 110 receives an authentication request related to authentication of a user of the electronic device 130, e.g. from the server 120 of the service provider or from electronic device 130 (e.g. as a re-direct of an authentication request or of a service request originally addressed by electronic device 130 to server 120), see step 201 of FIG. 2.

The identity provider server 110 checks or causes checking of an integrity of the electronic device and/or of the application 131 of the electronic device 130, see step 202 of FIG. 2.

Further, the identity provider server 110 performs or causes authentication of the user of the electronic device 130 towards server 120 of the service provider, see step 203 of FIG. 2.

Identity provider server 110 further performs returning or causing returning of authentication information towards the server 120 of the service provider, see step 204 of FIG. 2. Therein, at least a part of the authentication information and/or the returning of at least a part of the authentication information is indicative of the user having been authenticated by the authentication and wherein at least a part of the authentication information and/or the returning of at least a part of the authentication information represents that the electronic device and/or the application has/have been considered integer by the checking.

Figure 3:
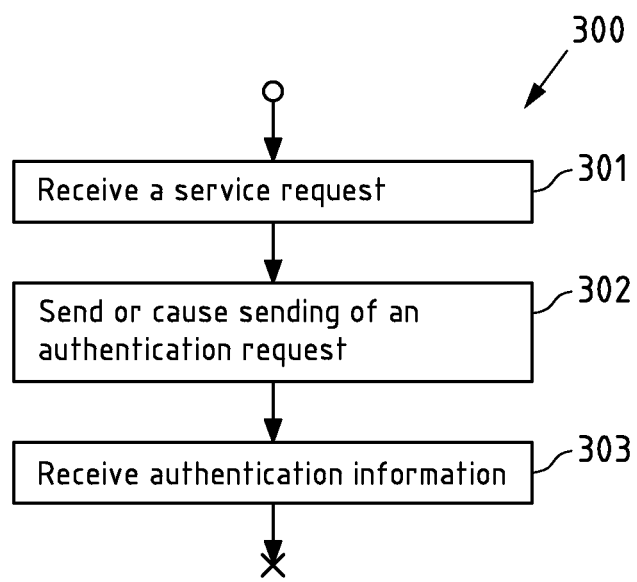
FIG. 3 shows a flowchart showing an example embodiment of a method according to the second exemplary aspect of the present invention, for instance performed by server 120 of FIG. 1.

The actions performed by server 120 of the service provider are at least (see FIG. 3 for an according flow chart 300):

The server 120 of the service provider receives a service request, which has been sent by the electronic device 130, see step 301 of FIG. 3.

Upon receiving the service request, the server 120 of the service provider sends or causes sending of the authentication request to the identity provider server 110, see step 302 of FIG. 3.

If the integrity of the electronic device 130 and/or of the application 131 of the electronic device 130 was confirmed and the user of the electronic device 130 has been authenticated, e.g. as performed and/or caused by the identity provider server 110, authentication information is received by the server 120 of the service provider, see step 303 of FIG. 3. Therein, at least a part of the authentication information is indicative of the user having been authenticated and at least a part of the authentication information and/or the returning of at least a part of the authentication information represents that the electronic device 130 and/or the application 131 of the electronic device 130 are considered integer. If the server 120, based on the authentication information, establishes that the user is authenticated and that the electronic device 130 and/or the at least one application are integer, server 120 may grant electronic device 130 access to the service requested by electronic device 130. This may for instance be performed by re-directing the electronic device 130 to a server where the requested service can be used, or by starting to provide the service to the electronic device 130.

Figure 4:
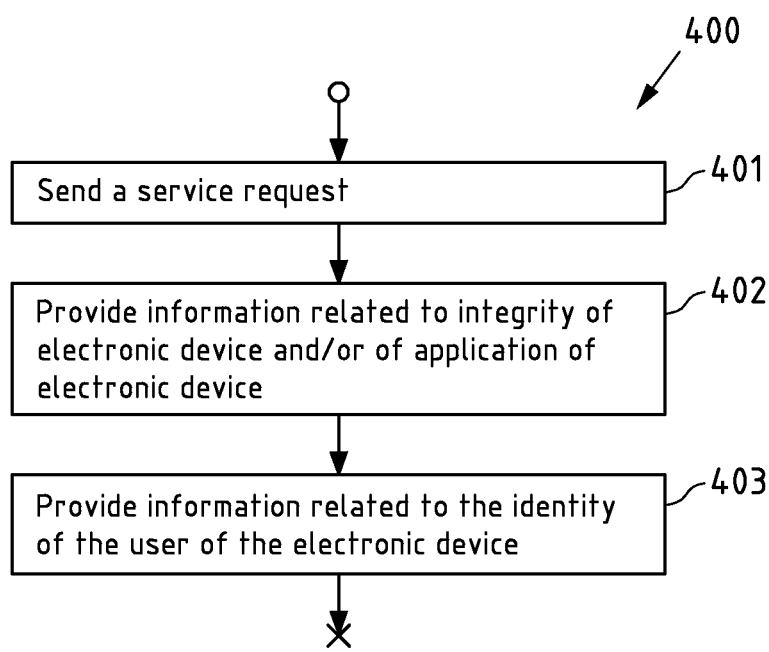
FIG. 4 shows a flowchart showing an example embodiment of a method according to the third exemplary aspect of the present invention, for instance performed by electronic device 130 of FIG. 1.

The actions performed by electronic device 130 are at least (see FIG. 4 for an according flow chart 400):

A service request is sent by the electronic device 130 to the server 120 of the service provider, see step 401 of FIG. 4.

The electronic device 130 further provides information related to the integrity of the electronic device and/or to the integrity of the application 131 of the electronic device 130, see step 402 of FIG. 4. This information may for instance be provided in response to a request/message from the identity provider server 110, or without request to server 120 of the service provider (e.g. within or together with the service request).

Therein, as already described above, the information related to the integrity of the electronic device and/or to the integrity of the application 131 of the electronic device 130 may for instance be provided in or together with the service request sent in step 401, so that steps 401 and 402 would then take place concurrently. It is also possible that step 402 takes place before step 401.

Furthermore, the electronic device 130 provides information related to the identity of the user of the electronic device 130, e.g. to the authentication server 150 or to the identity provider server 110 for provision to the authentication server 150, see step 403 of FIG. 4. Therein, the information related to the identity of the user may for instance be a credential of the user, such as for instance a login name and password combination. The identity of the user may for instance be an identity vis-à-vis the authentication server, and may not necessarily be the true identity of the user. For instance, the identity of the user may be an identity with which the user enrolled at the authentication server.

In the following, with reference to the actions S100-S105 shown in FIG. 1, an exemplary flow of a more detailed example embodiment of the present invention will be presented. These actions S100-S105 complement and/or refine the steps of the flowcharts of FIGS. 2, 3 and 4, respectively.

In a first and optional step S100, the electronic device 130 may obtain first information, e.g. a LogIn OTP, from the SSMS 140. This may for instance be performed upon startup of the application 131 of the electronic device 130. The first information is for instance representative of the electronic device 130 and/or the application 131 of the electronic device 130 having been found integer by the SSMS 140. The SSMS 140 may for instance come to this conclusion if at least one characteristic of the electronic device 130 and/or at least one characteristic of the application 131 (e.g. provided by the electronic device 130 to the SSMS 140) have been checked with a positive result. The at least one characteristic of the application 131 may for example be the state of not having been changed and/or the version (in particular the correct, e.g. the highest currently available version) and/or the identity and/or the correct assignment to the electronic device 130 of the application 131. The at least one characteristic of the electronic device 130 may for example be the state of not having been changed of the user access rights provided for by the manufacturer of the electronic device 130 for the electronic device 130 (thus for example manipulations by means of so-called jailbreak can be excluded). Several or all (e.g. a pre-defined selection) of these characteristics can be checked, and the first information may then only be issued by the SSMS 140 if all performed checks (and optionally also the authentication of the user of electronic device 130 towards SSMS 140, for example by means of a PIN or other credential) were successful. The application 131 may for example be considered to be in a state of not having been changed if it is in the original state or in a state that is derived from the original state only through official updates. This can for example be verified by hash-values of images of the software (for example in the flash memory or RAM of the electronic device 130).

In a second step S101, the user wants to access a service (e.g. calls a service URL for sending a service request). To this end, a service request may for instance be submitted to server 120 of the service provider, which may for instance comprise the first information.

In S102, the server 120 of the service provider has or establishes a direct trust relationship with the identity provider server 110. This trust relationship may for instance be based on an exchange of certificates between server 120 and server 110. For instance, server 120 and server 110 may store certificates (e.g. containing a public key of an asymmetric cryptographic key pair) of the respective other server and may for instance consider these certificates trustworthy. Furthermore, the addresses of servers 110 and 120 may have been mutually exchanged. The address of the identity provider server 110 may for instance be required at the server 120 of the service provider to be able to send or re-direct the authentication request to the identity provider server 110. The address of the server 120 of the service provider may for instance be required at the identity provider server 110 to enable the identity provider server 110 to send or cause sending of the authentication information to the server 120 of the service provider or—if this address is provided as call-back address with the authentication request, to check if this address is correct or trustworthy.

Based on this trust relationship, the server 120 of service provider sends (e.g. directly) or causes sending (e.g. by means of a re-direct operation via the electronic device 130) an authentication request to the identity provider server 110. Therein, the authentication request in turn may result from a re-direct of the service request.

In steps S103*a-c*, in reaction to the authentication request, the identity provider server 110 checks integrity of the electronic device 130 and/or integrity of the application 131 of the electronic device. This checking may for instance comprise checking (in particular of a pre-defined collection of) device-application binding and/or device version and/or application version and/or device state (e.g. concerning user rights) and/or application state (e.g. update state). This checking may involve communication with the SSMS 140, e.g. to compare current characteristics of the electronic device 130 and/or of application 131 with correspondingly desired characteristics stored by SSMS 140.

If optional step S100 was performed (i.e. the first information was obtained by the electronic device 130 from the SSMS 140 and for instance provided with the service request), the identity provider server 110 verifies with the SSMS 140 that the first information (e.g. a LogIn OTP) provided by the electronic device 130 in the service request (and forwarded to the identity provider server 110 with the authentication request) is correct (e.g. based on a certificate) and for instance also if the first information is not out-dated. This processing is represented by step S103*a*.

If optional step S100 was not performed, the first information (e.g. a LogIn OTP) has to be requested from the electronic device 130 by the identity provider server 110 in a step 103*b*. In response to this request, checking of the integrity of the electronic device 130 and/or of the application 131 is performed between electronic device 130/application 131 and SSMS 140, as illustrated by step 103*c*. This may for instance be performed as already described with reference to step S100 above. As a result of this processing, first information is provided from SSMS 140 to electronic device 130. This first information is then returned to identity provider server 110 in step 103*d*. Identity provider server 110 then verifies with the SSMS 140 that the first information provided by the electronic device 130 in step 103*d* is correct and for instance also if the first information is not out-dated. This processing is again represented by step S103*a*.

In step S104, if the electronic device 130 and/or application 131 have been found to be integer, the identity provider server 110 connects to the authentication server 150, e.g. a 3$^{rd}$ party identity provider (e.g. like Google or Facebook), for authentication of the user of electronic device 130. The identity provider server 110 may for instance have a direct trust relationship with the authentication server 150.

To allow for authentication of the user of electronic device 130, the identity provider server 110 may for instance pass through all requests and answers (e.g. by forwarding the requests and answers) of the authentication server 150 to the electronic device 130. The authentication server 150 may for instance ask/request for userID/password, which may be inputted by user, e.g. using user interface 860 of FIG. 8. A result of the authentication is then provided by authentication server 150 to identity provider server 110.

Instead of relaying the authentication-related communication between the authentication server 150 and the electronic device 130, the identity provider server 100 may alternatively re-direct the electronic device 130 to the authentication server 150 and thus enable a direct authentication procedure between the authentication server 150 and the electronic device 130. The result of this authentication issued by the authentication server 150 may then be provided by the electronic device 130 back to identity provider server 110. This variant is not shown in FIG. 1.

In step S105, if the identity provider server 110 establishes that the user of the electronic device 130 was authenticated by the authentication server 150, the identity provider server 110 returns (e.g. directly) or causes returning (e.g. via a response to a re-direct operation) of authentication information, e.g. a response to the authentication request, towards the server 120 of the service provider.

The authentication information may for instance comprise an authentication token. Therefore, authentication information is issued after successfully checking or causing checking integrity and performing or causing authentication.

In this way, the service provider associated with server 120 can rest assured that only an authenticated user can access a service provided by the service provider, and that this access takes place with an electronic device and/or an application that has been checked for integrity. If the electronic device 130 and/or the application 131 is/are considered integer, the service requested by the electronic device 130 respectively the user of the electronic device 130 may for instance be provided from the server 120 of the service provider to the electronic device 130, wherein the risk of fraudulent usage is reduced due to the checking of the integrity and due to the authentication of the user, both actions being orchestrated by the identity provider server 110.

In particular the communication between server 120 of the service provider and the identity provider server 110 as well as the communication between identity provider server 110 and authentication server 150 can be realized by using standard protocols, e.g. SAML 2.0, OpenID, or Oauth 2.0 to name but a few typical examples. In particular, in example embodiments of the present invention, the identity provider server 110 acts from the perspective of the server 120 of the service provider like an authentication server providing authentication of a user, and acts, from the perspective of the authentication server 150, like a server of a service provider requesting authentication of a user. However, identity provider server 110, in combination with SSMS 140, adds functionality to further check the integrity of the electronic device 130 and/or of an application 131 of the electronic device 130, and may only indicate to the server 120 of the service provider that the user has been authenticated if this is actually the case and if, in addition, the electronic device and/or the application of the electronic device has/have been found to be integer.

Figure 5A:
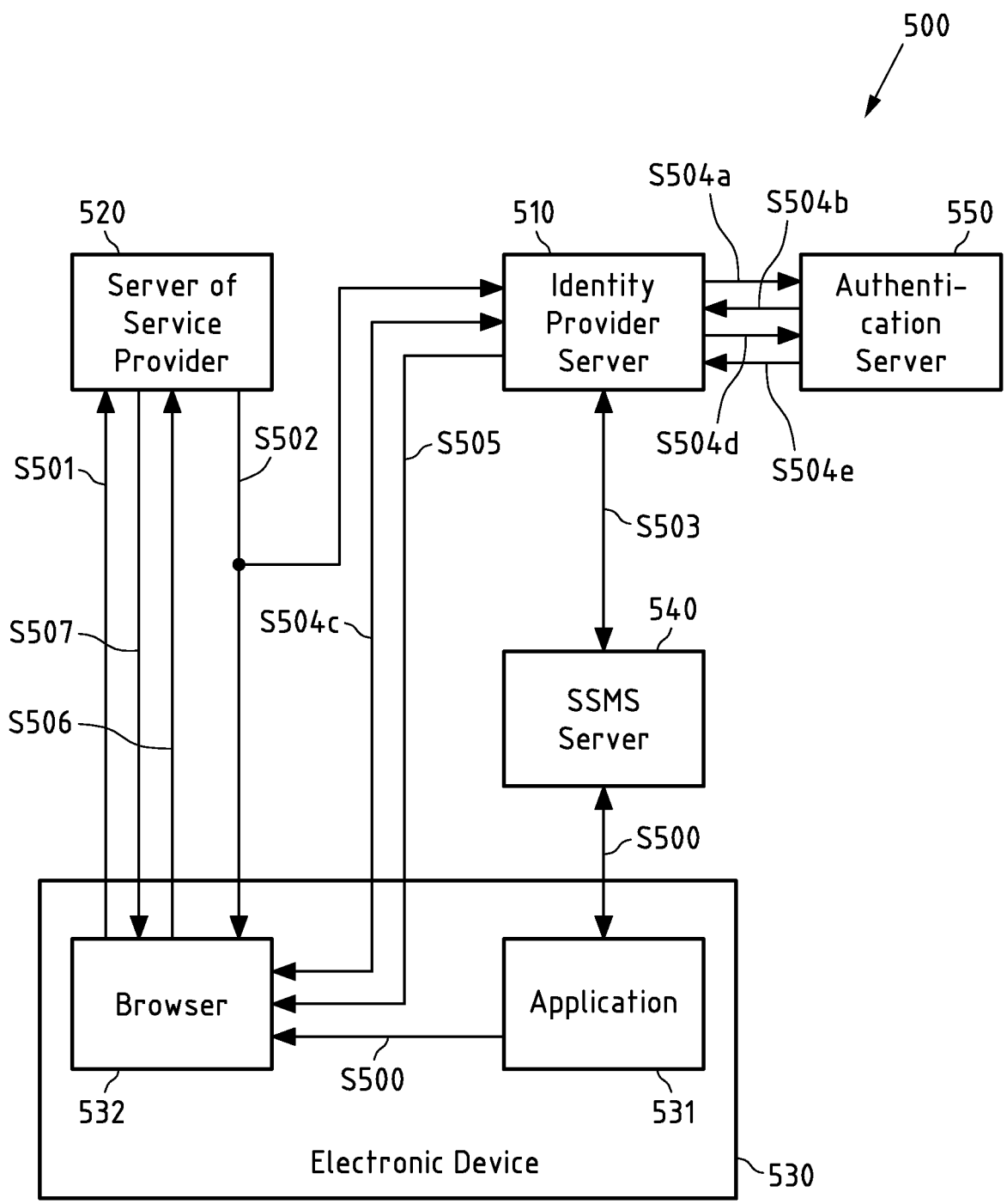
FIG. 5a shows a schematic block and interaction diagram of a system according to a further exemplary embodiment of the invention.

FIG. 5a is a schematic block and interaction diagram of a system 500 according to an exemplary embodiment of the invention. This embodiment inter alia contains the "implicit" first information provision approach described before.

System 500 comprises an identity provider server 510, a server 520 of a service provider, an electronic device 530, e.g. a terminal, an SSMS 540 and an authentication server 550. Servers 510, 520, 540, 550 and the electronic device 530 are in communication via one or more communication networks, so that the interaction between the entities of the system 500 as illustrated in FIG. 5a is possible. This communication may be wire-bound or at least partially wireless. The functionality of identity provider server 510 and SSMS 540 may for instance also be provided by the same server. Servers 510 and 520 and electronic device 530 represent apparatuses according to the first, second and third aspect of the present invention and are configured to perform and/or control the methods of the flowcharts 200, 300 and 400 of FIGS. 2-4, respectively.

The electronic device 530 comprises applications 531 and 532, which may for instance be installed on electronic device 530 and may e.g. be executed by using a processor and a memory. Application 531 may for instance be a security-related application that is for instance designed to communicate with SSMS 540, in particular to allow checking the integrity of application 531, and/or integrity of one or more further applications of electronic device 530 (such as e.g. application 532) and/or integrity of electronic device 530 itself. Application 532 may for instance be a thin-client application and/or an application that runs in a sandbox. Application 532 is, in the example embodiment of FIG. 5a, embodied as a browser. Application 532 may for instance not be able to direct requests to application 531, since application 532 (e.g. a standard browser, e.g. on a mobile phone or smartphone) runs in a sandbox. However, it may still be possible for application 531 to trigger start of application 532.

In step S500 of FIG. 5a, application 531 of electronic device 530 may for instance login to the SSMS 540 and obtain first information, e.g. a LogIn OTP, e.g. as already described for step 100 of FIG. 1 above. The first information may for instance be obtained by using a secure communication channel.

In step S500, the application 531 of the electronic device 530 may for instance cause launching of application 532. For instance, application 532, embodied as a browser, may be provided with a start URL of the server 520 of the service provider and with the first information by application 531.

In step S501, a service request is sent to the server 520 of the service provider, e.g. by sending an URL request with attached URL parameter. The attached URL parameter may for instance comprise the obtained first information.

In step S502, the server 520 of the service provider sends an authentication request towards the identity provider server 510, e.g. via a re-direct operation that causes the application 532 (browser) of the electronic device 530 to establish a connection to the identity provider server 510, wherein the first information is preserved in the authentication request. Thus, the identity provider server 510 is provided with the first information together with the authentication request. The re-direct is shown in FIG. 5a by the double-arrow of step S502.

In step S503, the identity provider server 510 checks the obtained first information by communication with SSMS 540 that issues this first information, e.g. by using a so-called SOAP (SOAP: Simple Object Access Protocol). Upon receiving the first information from the identity provider server 510, the SSMS 540 may check the first information, e.g. by comparing it with first information for instance stored in a database. This may for instance involve checking if the first information is still valid, e.g. based on a validity period associated therewith (e.g. included therein). The SSMS 540 may send a response of the result of the check (e.g. "authentication o.k.") towards the identity provider server 510.

In step S504a, the identity provider server 510 causes authentication of the user of the electronic device by the authentication server 550 based on a trust relationship between the identity provider server 510 and the authentication server 550. To this end, the identity provider server 510 sends an authentication request (e.g. the same authentication request received at identity provider server 510, or a new authentication request formulated by identity provider server 510) to authentication server 550. The authentication server 550 then sends, in step S504b, an authentication web page (that e.g. asks a username/password combination or similar credentials from the user) to the identity provider server 510, which presents this authentication web page or a representation thereof to the user, e.g. by embedding this authentication web page into a web page of the identity provider server 510 and sending the resulting web page to the electronic device 530, as illustrated by step S504c. The user may then for instance provide or cause provision of credentials, which are used for authentication of the user. The credentials may for instance be comprised by electronic device 530, e.g. by being stored in a memory of the electronic device 530 or by being hard-coded in the electronic device 530, or the user may enter its credentials into the electronic device 530, wherein this information is sent subsequently from the electronic device 530 towards the identity service provider 510 (step S504c) which in turn forwards them to authentication server 550 (step S504d).

In step S504e, the authentication server 550 returns response information that is indicative of the success of the authentication of the user towards the identity provider server 510. Identity provider server 510 may then for instance verify the response information, e.g. using the trust relationship between the identity provider server 510 and the authentication server 550.

In step S505, the identity provider server 510 may then for instance send authentication information towards application 532 of the electronic device 530, wherein this authentication information (which may be considered a response to the authentication request of step S502) may for instance comprise attributes and/or extended information about the user as e.g. provided by the authentication server 550 in the response information.

In step S506, the authentication information (or a representation thereof) is returned towards the server 520 of the service provider by application 532. Steps S505 and S506 may equally well be considered as a return re-direct operation, e.g. in response to the re-direct operation of step S502.

From the received authentication information, server 520 thus can comprehend that the user of the electronic device 530 has been authenticated and that the electronic device 530 and/or application 531 and/or application 532 are integer. Server 520 may thus grant electronic device 530 access to the service requested in step S501, as illustrated by step S507. Therein, the service to which access is granted may not necessarily provided by the server 520, but may equally well be provided via another server of the service provider (or associated with the service provider), e.g. via a re-direct.

In the present embodiment, the application 531 of the electronic device 530 is used as an authentication application that is separate from the application 532, which may for instance be a browser application. The first information (e.g. a LogIn OTP) is advantageously retrieved from SSMS 540 by the application 531 and "implicitly" provided to the identity service provider 510 by including it into the service request and the authentication request (see steps S500, S501 and S502). This avoids that the first information has to be "explicitly" requested by the identity provider server 510 from the electronic device 530, wherein such an "explicit" request would require the browser application 532, in order to request the first information from application 531, to break out of the sandbox (the shielded environment) in which it is running within electronic device 530.

Figure 5B:
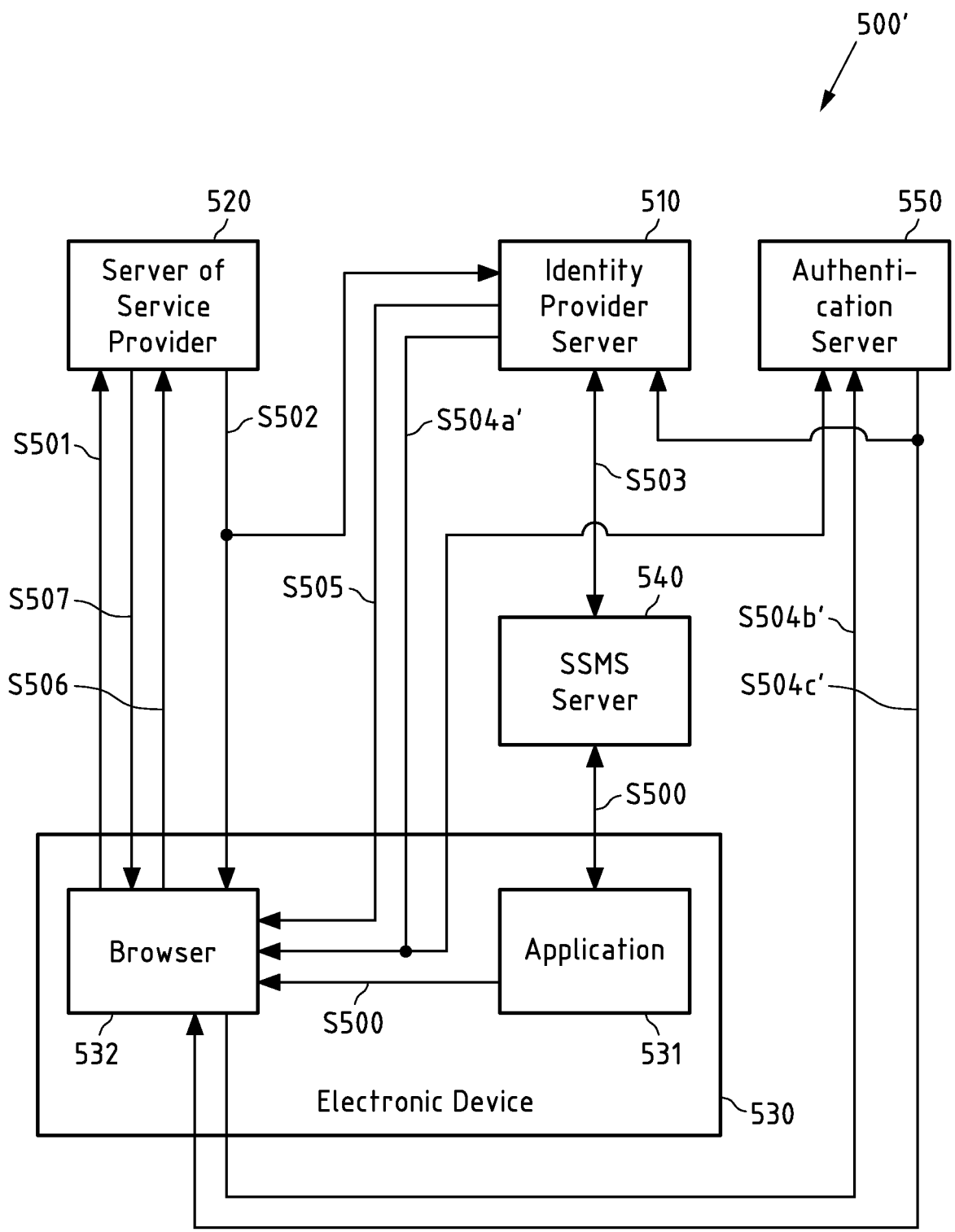
FIG. 5b shows a schematic block and interaction diagram of a system according to a further exemplary embodiment of the invention.

FIG. 5b is a schematic block and interaction diagram of a system 500' according to an exemplary embodiment of the invention. This embodiment inter alia contains the "implicit" first information provision approach described before.

The system and interaction according to FIG. 5b differs from the system and interaction of FIG. 5a only in the way in which the authentication of the user vis-à-vis the authentication server 550 takes place. In particular, steps S504a-S504e of FIG. 5a are replaced by steps S504a'-S504c' of FIG. 5b.

In step S504a' of FIG. 5b, the identity provider server 510 causes authentication of the user of the electronic device 530 by the authentication server 550. To this end, a re-direct of the authentication request (see step S502) to the authentication server 550 is caused by identity provider server 510 in step S504a' (based on the trust relationship between identity provider server 510 and authentication server 550) causing the application 532 of the electronic device 530 to establish a connection (e.g. a dedicated and/or separate connection that is not relayed via the identity provider server 510) with the authentication server 550. In the authentication of the user now taking place vis-à-vis the authentication server 550 (e.g. via an authentication web page presented to the user via application 532), the user may for instance provide or cause provision of credentials, which are used for authentication of the user. The credentials may for instance be comprised by electronic device 530, e.g. by being stored in a memory of the electronic device 530 or by being hard-coded in the electronic device 530, or the user may enter its credentials into the electronic device 530, wherein this information is sent subsequently from the electronic device 530 towards the authentication server 550 in step S504b'.

In step S504c', the authentication server 550 returns response information that is indicative of the success of the authentication of the user towards the identity provider server 510. This is achieved by a reverse re-direct operation in which the response information is provided to electronic device 530 and from there to identity provider server 510. To this end, a callback-URL identifying the identity provider server 510 may for instance have been provided to the authentication server 550 together in step S504a'. Identity provider server 510 may then for instance verify the response information, and the processing may continue with step S505 as described with reference to FIG. 5a above.

Figure 6:
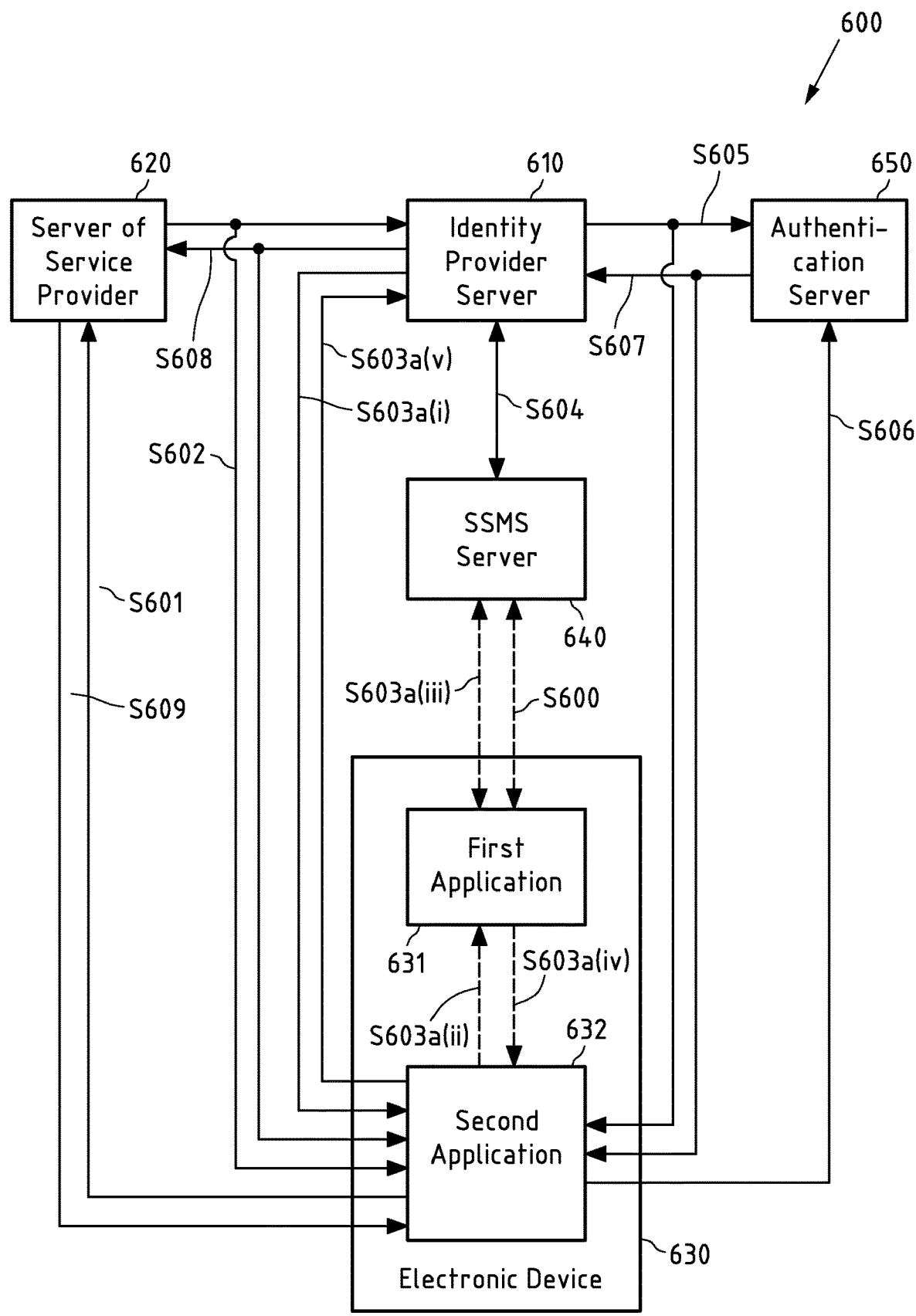
FIG. 6 shows a schematic block and interaction diagram of a system according to a further exemplary embodiment of the invention.

FIG. 6 is a schematic block and interaction diagram of a system 600 according to an exemplary embodiment of the invention. This embodiment inter alia contains the "explicit" first information provision approach described before.

System 600 comprises an identity provider server 610, a server 620 of a service provider, an electronic device 630, e.g. a terminal, an SSMS 640 and an authentication server 650. Servers 610, 620, 640, 650 and the electronic device 630 are in communication via one or more communication networks, so that the interaction between the entities of the system 600 as illustrated in FIG. 6 is possible. This communication may be wire-bound or at least partially wireless. The functionality of identity provider server 610 and SSMS 640 may for instance also be provided by the same server. Servers 610 and 620 and electronic device 630 represent apparatuses according to the first, second and third aspect of the present invention and are configured to perform and/or control the methods of the flowcharts 200, 300 and 400 of FIGS. 2-4, respectively.

The electronic device 630 comprises a first application 631, which may for instance be installed on electronic device 630 and may e.g. be executed by using a processor and a memory. Application 631 may for instance be a security-related application that is for instance designed to communicate with SSMS 640, in particular to allow checking the integrity of application 631 and/or of the integrity of application 632 and/or the integrity of the electronic device 630. The electronic device 630 further comprises a second application 632, which may for instance be installed on electronic device 630 and may e.g. be executed by using a processor and a memory. The second application 632 may for instance be configured to communicate with server 620, e.g. to request and/or use a service (e.g. a financial transaction service) provided by server 620. The second application 632 may for instance be a rich-client application and/or an application that does not run in a sandbox. It is thus possible for the second application 632 to direct requests to the first application (e.g. to obtain first information, such as a LogIn OTP, as will be discussed with reference to step S603a(ii) below). It should be noted that the functionality of the first application 631 and the second application 632 may equally well be combined into a single application (not shown in FIG. 6).

In an optional step S600, the electronic device 630 and/or the first application 631 of the electronic device 630 may for instance login to the SSMS 640 (e.g. without further user action, e.g. without requiring entry of credentials (such as a PIN) by a user), and obtain first information, e.g. a LogIn OTP. The first information may for instance be obtained by using a secure communication channel. The first information may for instance be indicative of the electronic device 630 and/or the first application 631 and/or the second application 632 being considered integer by the SSMS 640. The first information may for instance result from a process that has already been described with reference to S500 of FIG. 5a above.

In step S601, a service request is sent to the server of the service provider 620, e.g. by sending an URL request by second application 632. In contrast to step S501 of FIGS. 5a and 5b, this service request does however not comprise the first information.

In step S602, the server 620 of the service provider sends an authentication request towards the identity provider server 610, e.g. via a re-direct operation that causes the application 631 of the electronic device 630 to establish a connection to the identity provider server 610 (shown as step S602).

In step S603a(i), the identity provider server 610 may for instance send an explicit request towards the electronic device 630 for obtaining the first information, e.g. the LogIn OTP. If step S600 has not been performed, electronic device 630 will then obtain such first information from SSMS 640. To this end, second application 632 sends a request in step S603a(ii) to the first application 631, which then enters into processing and communication with SSMS 640 to check integrity of the first application 631 and/or the second application 632 and/or the electronic device 630 as illustrated by step S603a(iii). This processing corresponds to the processing in step S500 already discussed for FIG. 5a above. Otherwise, the first information already received in step S600 is used. In step S603a(iv), the first information is provided from the first application 631 to the second application 632. In step S603a(v), the first information is then sent from the electronic device 630 (second application 632) to the identity provider server 610.

In step S604, the identity provider server 610 checks the obtained first information against the SSMS 640, as has already been described with reference to step S503 of FIG. 5a above.

In step S605, the identity provider server 610 causes authentication of the user of the electronic device 630 by the authentication server 650. To this end, a re-direct of the authentication request (see step S602) to the authentication server 650 is caused by identity provider server 610 in step S605 (based on the trust relationship between identity provider server 610 and authentication server 650) causing the second application 632 of the electronic device 630 to establish a connection with the authentication server 650.

In the authentication of the user now taking place vis-à-vis the authentication server 650 (e.g. via an authentication web page presented to the user via the second application 632), the user may for instance provide or cause provision of credentials, which are used for authentication of the user. The credentials may for instance be comprised by electronic device 630, e.g. by being stored in a memory of the electronic device 630 or by being hard-coded in the electronic device 630, or the user may enter its credentials into the electronic device 630, wherein this information is sent subsequently from the electronic device 630 towards the authentication server 650 in step S606.

In step S607, the authentication server 650 returns response information that is indicative of the success of the authentication of the user towards the identity provider server 610. This is achieved by a reverse re-direct operation in which the response information is provided to electronic device 630 and from there to identity provider server 610. Identity provider server 610 may then for instance verify the response information.

In step S608, the identity provider server 610 may then for instance send authentication information towards server 620 of the service provider, e.g. by means of a return re-direct operation via electronic device 630 (this may however also be realized by two distinct steps, in which authentication information is first sent to electronic device 630 and then this authentication information or a representation thereof is sent from electronic device 630 to server 620). The authentication information (which may be considered a response to the authentication request of step S602) may for instance comprise attributes and/or extended information about the user as e.g. provided by the authentication server 650 in the response information of step S607.

From the received authentication information, server 620 thus can comprehend that the user of the electronic device 630 has been authenticated and that the electronic device 630 and/or application 631 and/or application 632 are integer. Server 620 may thus grant electronic device 630 access to the service requested in step S601, as illustrated by step S609.

It should be noted that, as an alternative to the authentication of the user vis-à-vis the authentication server 640 as explained with reference to steps S605-S607 of FIG. 6, the authentication approach described with reference to steps S504*a*-S504*e* of FIG. 5*a* could be used, wherein an authentication web page of authentication server 650 would then be embedded into a web page of identity provider server 610 and displayed to the user of electronic device 630.

The embodiment explained with reference to FIG. 6 uses an explicit requesting of the first information from the electronic device 630 by the identity provider server 610 (see step S603*a*(i)), i.e. the first information is not already provided with the service request of step S601. Thus it is not necessary to preserve URL parameters like the first information during the redirect operation of step S602. This may exhibit a larger degree of compatibility with existing Identity Provision (IdP) concepts (such as SAML, Oauth 2.0 or OpenID). This approach may for instance work better with OpenID connect using an application (e.g. the second application 632, or an application that combines the functionality of the first application 631 and the second application 632) that has both the application layer and the security layer in one instance, since then no sandbox breaking is required when explicitly requesting/retrieving the first information (steps S603*a*(ii) and S603*a*(iv)).

In the example embodiments described with references to FIGS. 1-6 above, the communication of information between the server of the service provider and the identity provider server may be performed directly, or via the electronic device. In the latter case, for instance HTTP redirect operations (in one or both directions) or form-based HTTP POST operations (in one or both directions), in particular with related submission trigger as described above, may be used, as it is for instance described in document "Bindings for the OASIS Security Assertion Markup Language (SAML) V2.0", OASIS Standard, 15 Mar. 2005 for the cases of HTTP Redirect Binding and HTTP POST Binding, respectively. Similarly, the communication of information between the identity provider server and the authentication server may be performed directly, or via the electronic device. In the latter case, for instance HTTP redirect operations (in one or both directions) or form-based HTTP POST operations (in one or both directions), in particular with related submission trigger as described above, may be used, as it is for instance described in the above-introduced document "Bindings for the OASIS Security Assertion Markup Language (SAML) V2.0" for the cases of HTTP Redirect Binding and HTTP POST Binding, respectively.

Figure 7:
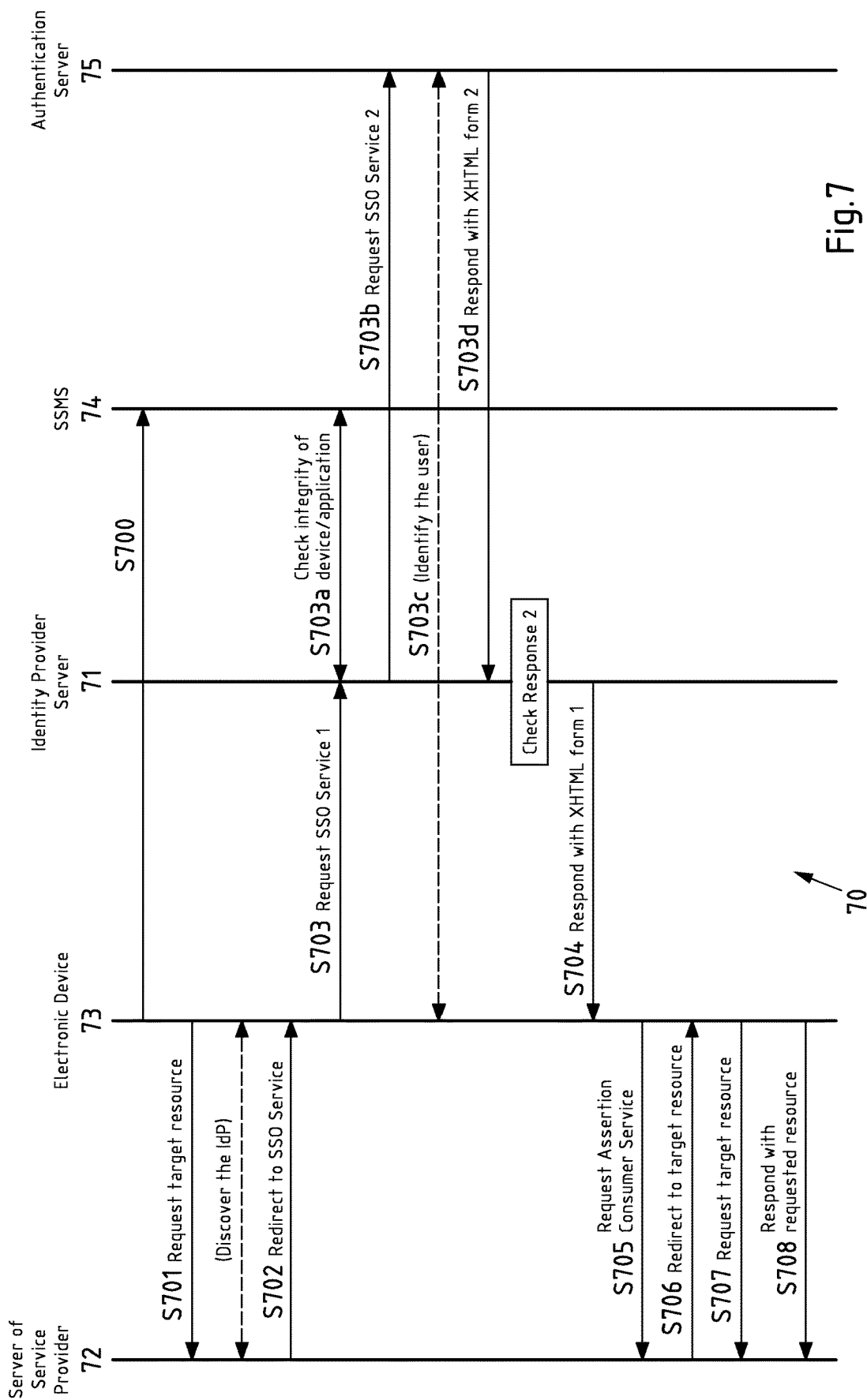
FIG. 7 shows a message flow according to an exemplary embodiment of the present invention.

FIG. 7 is a message flow 70 of an exemplary embodiment of the present invention. For instance, the message flow 70 may in particular describe the message flow according to the exemplary embodiments of FIG. 5*a*, 5*b* or FIG. 6 of the present invention.

Message flow 70 illustrates messages flowing between a server 72 of a service provider, an electronic device 73, an identity provider server 71, an authentication server 75 and an SSMS 74, wherein the SSMS 74 may be a dedicated entity, or may be at least a part of the identity provider server 71.

Between the identity provider server 71 and the server 72 of the service provider, a first trust relationship may have been established, e.g. before the exchange of messages shown in flowchart 70 starts. For instance, the server 72 of the service provider may know address information (e.g. a URL) and/or a public key (e.g. a public signature key) of the identity provider server 71, and may for instance be able to verify signatures of the identity provider server 71. Furthermore, the identity provider server 71 may have its own private key (e.g. for issuing digital signatures).

Further, a second trust relationship may have been established between the identity provider server 71 and the authentication server 75, e.g. before the exchange of messages shown in flowchart 70 starts. The identity provider server 71 may for instance know the address (e.g. URL) of authentication server 75 and a public key (e.g. a public signature key) of the authentication server 75.

These trust relationships may also have been established in the example embodiments of FIGS. 5*a*, 5*b* and 6 described above.

The example message flow 70 shown in FIG. 7 is based on the SAML 2.0 framework (the specification of which is available at http://saml.xml[dot]org/saml-specifications). It is to be understood that further protocols and/or authentication frameworks, e.g. Oauth2.0 (see Request for Comments document RFC 6749 published by the Internet Engineering Taskforce (IETF)), OpenID (see http://openid[dot]net/connect/), or the like may be implemented and used together with exemplary aspects of the invention. In particular, authentication protocols and/or authentication frameworks for web-based services may be used. In the example of FIG. 7, it is instructive to see how the identity provider server 71 acts, in the view of the server 72 of the service provider, like an identity provider (like authentication server 75), and acts, in the view of the authentication server 75, like a server 72 of a service provider. Thus, according to example embodiments of the invention, the SAML framework can be used, but in addition to the user authentication offered by the SAML framework, additional device/application integrity checking functionality is added.

It should be noted that the "implicit" first information (LogIn OTP) retrieval approach (see FIG. 5*a*/5*b*) will be referred to in the following.

Step S700 of FIG. 7 may for instance be represented by step S500 of FIG. 5*a*/5*b*. In step 700, the electronic device 73, e.g. electronic device 530 of FIG. 5*a*/5*b*, authenticates towards the SSMS 74, e.g. SSMS 540 of FIG. 5*a*/5*b*, and may obtain first information, e.g. a LogIn OTP.

In step S701, a service request, e.g. a message 'request target resource' as defined by SAML, with optional first information (LogIn OTP appended) may be sent to the server 72 of service provider, e.g. server 520 of the service provider of FIG. 5*a*/5*b* (step S501). For instance, the electronic device 73 may call a URL of the service, e.g. https://sp.example[dot]com/myresource?loginOTP=1234 according to the HTTP protocol usage within a SAML flow.

In step S702, a message 'redirect to SSO service' (SSO: Single-Sign-On) as defined by SAML may be sent to electronic device 73, e.g. by a re-direct to the identity provider server 71, e.g. identity provider server 510 of FIG. 5*a*/5*b* (step S502). The re-direct may for instance preserve the first information, e.g. LogIn OTP, and may use the trust relationship between the identity provider server 71 and the server 72 of service provider.

In step S703, the re-direct of step S702 causes the electronic device 73 to direct a first message 'request SSO service 1' as defined by SAML to identity provider server 71. Therein, the first information, e.g. LogIn OTP, is preserved.

In step S703*a*, the identity provider server 71 verifies the first information, e.g. LogIn OTP, towards SSMS 74 (e.g. by checking if SSMS 74 has such a LogIn OTP stored or if the LogIn OTP has in fact been issued by the SSMS 74 and has not been altered since its issuance). In case the first information cannot be verified, authentication has failed due to failed integrity checking, and the service requested from the service provider may then not be provided towards the electronic device 73.

In case checking integrity of electronic device 73 and/or of the at least one application yielded a positive result, in step S703*b*, identity provider server 71 causes authentication of the user of the electronic device 73 vis-a-vis authentication server 75, e.g. authentication server 550 of FIG. 5*a*/5*b*, by sending a message 'request SSO service 2'. Message 'request SSO service 2' may for instance contain a separate, in particular second SAML request, which may be based on the second trust relationship between identity provider server 71 and authentication server 75. Here, identity provider server 71 acts, towards authentication server 75, in a role of a service provider, e.g. as if step S703*b* and S703*d* would be performed in interaction with a server of a service provider. The transmission of information in step 703*b* may for instance be performed between both servers 71 and 75 directly, as shown in FIG. 7 (corresponding to step S504*a*) of FIG. 5*a*, or via electronic device 73 (not shown in FIG. 7, e.g. via HTTP redirect and/or form-based HTTP POST operations, in particular with related submission trigger), see step S504*a*' of FIG. 5*b*), as has already been explained above.

In step S703*c*, for instance represented by steps S504*b*-S504*d* of FIG. 5*a* or step S504*b*' of FIG. 5*b*, authentication server 75 requests information related to an identity of the user of the electronic device 73, wherein electronic device 73 may provide said information related to an identity of a user of the electronic device 73. Upon receiving the credentials entered by the user of the electronic device 73, the authentication server 75 may for instance verify or check the credentials.

In step S703*d*, authentication server 75 may return response information (e.g. as an XHTML form 2) to the identity provider server 71. Response information may for instance be a message, e.g. a SAML response as an answer to the second SAML request of step S703*b*. Upon receiving authentication information from the electronic device 73, the identity provider server 71 may check or verify the received response information. The transmission of information in step 703*d* may for instance be performed between both servers 75 and 71 directly, as shown in FIG. 7 (corresponding to step S504*e*) of FIG. 5*a*, or via electronic device 73 (not shown in FIG. 7, e.g. via HTTP redirect and/or form-based HTTP POST operations, in particular with related submission trigger), see step S504*c*' of FIG. 5*b*), as has already been explained above.

The response information may for instance comprise a status code (e.g. samlp:StatusCode) that indicates if the authentication of the user was successful or not (i.e. if the user was authenticated or not), a digital signature of the authentication server 650, information on the (e.g. time-limited) validity of the response information, information on the addressee of the response information (e.g. an address of the identity provider server 610), and/or an authentication token (e.g. in a "Relaystate" field) that may be required to access the service of the service provider as originally requested by the electronic device 630.

In step S704, e.g. represented by step S505 of FIG. 5*a*/5*b*, identity provider server 71 responds with a message, e.g. SAML response as an answer to the first SAML request of step S703 to electronic device 73, which in turn sends, in step S705 that corresponds to step S506 of FIG. 5*a*/5*b*, a message 'Request Assertion Consumer Service' to the server 72 of the service provider.

The server 72 of the service provider may then re-direct the electronic device 73 to the resource of the requested target (which may be on the same server 72, or on a different server of the service provider) to enable the electronic device 73 to use the service, see steps S706-S708.

The message flow 70 of FIG. 7, as far as the applicability of the SAML framework is concerned, can alternatively also be applied to the "explicit" first information retrieval approach (see FIG. 6). Step S700 would then be dispensed with, no first information would be provided in steps S701-S703, and the processing of step S703*a* would be changed to include an explicit requesting of the first information from SSMS 74 by the electronic device 73 and the provision of such first information from the SSMS 74 to electronic device 73 and then to identity provider server 71.

Similarly, the SAML-based message flow 70 of FIG. 7 may be altered so that, instead of the direct (second) SAML request to the authentication server 75 triggering presentation of an authentication web of the authentication server 75 embedded into a web page of the identity service provider 71, via which web page the user of the electronic device 73 may then provide credentials to the identity provider server to be relayed to the authentication server, as per steps S703*b*-S703*d* of FIG. 7, the (second) SAML request (see step S703*b* of FIG. 7) may be re-directed from identity provider server 71 to authentication server 75 via the electronic device, and the electronic device 73 may then authenticate towards the authentication server 75 directly, which would then direct its SAML response (see step S703*d*) to the identity provider server 71 via electronic device 73 (as it was described with reference to steps S504*a*'-S504*c*' of FIG. 5*b* above).

With respect to the example embodiments of the present invention described with reference to FIGS. 1-7 above, the following extensions are conceivable:

Extension #1: An additional user credential (e.g. PIN) verification may be performed by the SSMS before issuing the first information. With this additional option, not only the electronic device and/or the at least one application are verified, but also the user of the electronic device. This can advantageously be taken as an additional security check in addition to the authentication towards the authentication server.

Extension #2: The authentication server might be called by the identity provider server only for the very first time during initial enrollment of the user at the authentication server or for the very first authentication of the user after initial enrollment of the user at the authentication server. The authentication server might issue a short-term or long-term authentication token towards the identity provider server. For all subsequent calls (or as long as the authentication token is valid), the identity provider server may then for instance authenticate the user only through the user-provided credential PIN against the SSMS (as described for extension #1 above), so that the call to the authentication server can be avoided. This means that the authentication server is used less frequent. User credentials (e.g. username/password) then may advantageously not need to be provided to the authentication server (e.g. entered into the electronic device) for each login, and thus are less exposed to be stolen.

Extension #3: Secure initial end user or application enrollment/onboarding at the identity service provider server (e.g. by calling an Application Programming Interface (API) of the SSMS), or at the SSMS. The application of the electronic device may for instance be enrolled to the enrollment server from a mobile device or desktop PC using a "web view"-based application (e.g. an application with embedded web content) or a web browser and may optionally have one or more of the following:

(a) certificate pinning (also denoted as public key pinning) for SSL/TLS connection to the enrollment server
(b) authentication certificate hard coded in the client (e.g. in the application to be enrolled or in the electronic device)
(c) authentication code obtained by client (e.g. the electronic device) after answering security questions or "know your customer" procedure from separate portal
(d) by asking additional know your customer (KYC) and security questions at the enrollment portal where customer is entering Active directory (AD) credentials (alternatively, Lightweight Directory Access Protocol (LDAP) credentials may be entered)
(e) by approving from another enrolled application the user already has
(f) by approving or obtaining approval code or fingerprint from another hardware-based registered device such as an OTP token, smartcard, bank card with smart card chip, bluetooth token, wifi/bluetooth/ethernet mac address of a registered device, FID 0 token etc.

The above enrollment could also be achieved using a REST or SOAP XML or similar API interface on the enrollment portal.

Figure 8:
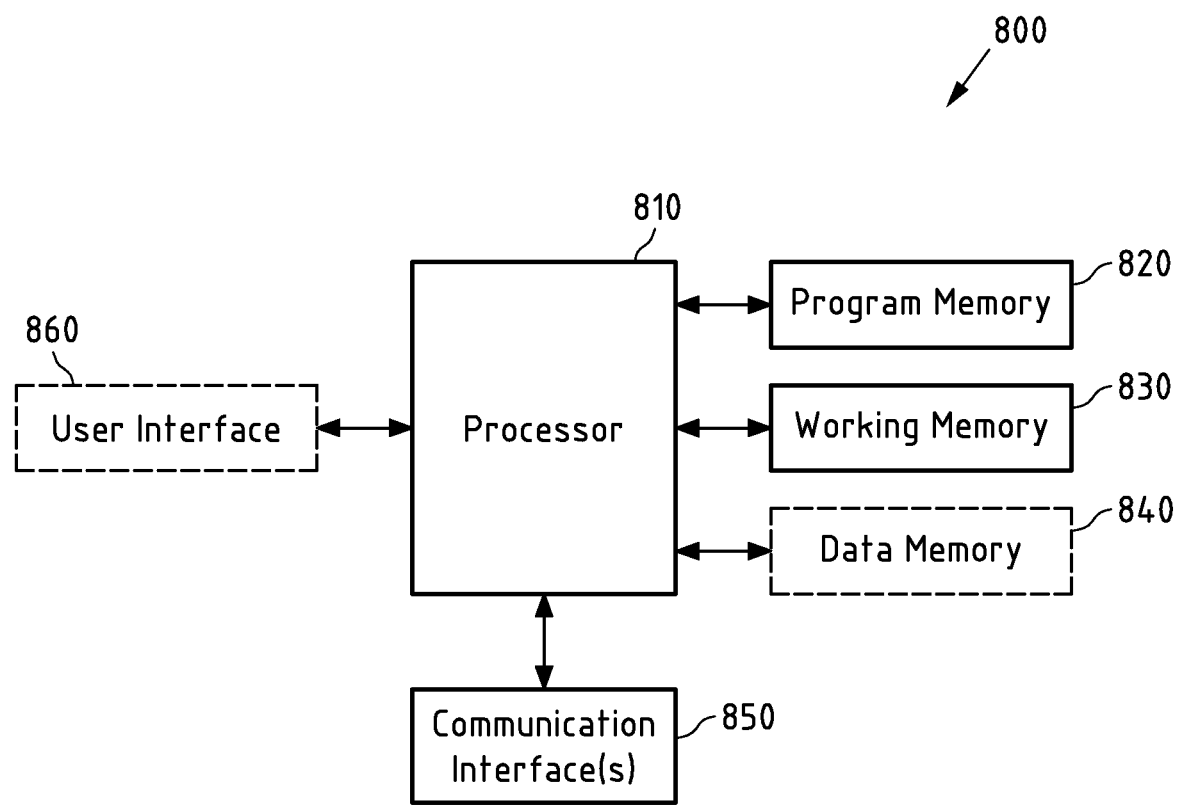
FIG. 8 shows a schematic block diagram of an apparatus according to an exemplary embodiment of the present invention.

FIG. 8 is a schematic block diagram of an apparatus 800 according to an example embodiment of the present invention. Apparatus 800 may for instance be an apparatus according to the first aspect of the present invention and then e.g. represent identity provider server 110 of FIG. 1, 510 of FIG. 5*a*/5*b* or 610 of FIG. 6, or may for instance be an apparatus according to the second aspect of the present invention and then e.g. represent server 120 of FIG. 1, 520 of FIG. 5*a*/5*b* or 620 of FIG. 6, or may for instance be an apparatus according to the third aspect of the present invention and then e.g. represent electronic device 130 of FIG. 1, 530 of FIG. 5*a*/5*b* or 630 of FIG. 6, or respective parts thereof.

Apparatus 800 comprises a processor 810, program memory 820, working memory 830, one or more communication interface(s) 850, optional data memory 840 and optional user interface 860.

Apparatus 800 may for instance be configured to perform and/or control or comprise respective means (810-860) for performing and/or controlling the method according to the first, second or third exemplary aspect of the present invention (e.g. according to the flowcharts 200 of FIG. 2, 300 of FIG. 3 or 400 of FIG. 4). Apparatus 800 may as well be an apparatus comprising at least one processor 810 and at least one memory (820-840) including computer program code, the at least one memory and the computer program code configured to, with the at least one processor, cause an apparatus (e.g. apparatus 800) at least to perform and/or control the method according to the first, second or third exemplary aspect of the invention.

Processor 810 may for instance control at least one of the memories (820, 830), the optional data memory 840, communication interface(s) 850 and the optional user interface 860.

Processor 810 may for instance execute computer program code stored in program memory 820, which may for instance represent a computer readable storage medium comprising program code that, when executed by processor 810, causes processor 810 to perform the method according to the first, second or third exemplary aspect of the present invention.

Processor 810 (and also any other processor mentioned in this specification) may be a processor of any suitable type. Processor 810 may comprise but is not limited to one or more microprocessor(s), one or more processor(s) with accompanying one or more digital signal processor(s), one or more processor(s) without accompanying digital signal processor(s), one or more special-purpose computer chip(s), one or more field-programmable gar array(s) (FPGA(s), one or more controller(s), one or more application-specific integrated circuit(s) (ASIC(s)), or one or more computer(s). The relevant structure/hardware has been programmed in such a way to carry out the described function. Processor 810 may for instance be an application processor that for instance runs an operating system.

Program memory 820 may also be included into processor 810. This memory may for instance be fixedly connected to processor 810, or be at least partially removable from processor 810, for instance in the form of a memory card or stick. Program memory 820 may for instance be non-volatile memory. It may for instance be a FLASH memory (or a part thereof) or a hard disc (or a part thereof), to name but a few examples. Memory may also comprise an operating system for processor 810. Program memory 820 may also comprise a firmware for apparatus 800.

In the apparatus 800, further a working memory 830 is present, for instance in the form of a volatile memory. It may for instance be a Random Access Memory (RAM) or Dynamic RAM (DRAM), to give but a few non-limiting examples. It may for instance be used by processor 810 when executing an operating system and/or computer program.

Optional data memory 840 may for instance be a non-volatile memory. It may for instance be a FLASH memory (or a part thereof), any of a ROM, PROM, EPROM and EEPROM (or a part thereof) or a hard disc (or a part thereof), to name but a few examples. Optional data memory 840 may for instance store first information, in particular first information useable for checking the integrity of an electronic device (e.g. apparatus 800) and/or of at least one application.

Communication interface(s) 850 enable apparatus 800 to communicate with other entities, as is apparent from the interactions illustrated between the entities of FIGS. 1, 5*a*, 5*b*, 6 and 7. The communication interface(s) 850 may for instance comprise a wireless interface (e.g. a cellular radio communications interface and/or a WLAN interface) and/or a wire-bound interface, such as for instance an IP-based interface, for instance to communicate with entities via the Internet.

Optional user interface 860 may comprise a display for displaying information to a user and/or an input device (e.g. a keyboard, keypad, touchpad, mouse, etc.) for receiving information (such as credentials) from a user.

Some or all of the components of the apparatus 800 may for instance be connected via a bus. Some or all of the components of the apparatus 800 may for instance be combined into one or more modules.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g. disk, memory, or the like) to be executed by such a processor. References to a 'computer-readable storage medium' should be understood to encompass specialized circuits such as FPGAs, ASICs, signal processing devices, and other devices.

The expression 'A and/or B' is considered to comprise any one of the following three scenarios: (i) A, (ii) B, (iii) A and B. Furthermore, the article 'a' is not to be understood as 'one', i.e. use of the expression 'an element' does not preclude that also further elements are present. The term 'comprising' is to be understood in an open sense, i.e. in a way that an object that 'comprises an element A' may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented of an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for respective embodiment described by the respective figure.

The invention has been described above by means of example embodiments. It should be noted that there are alternative ways and variations which are obvious to a person skilled in the art and can be implemented without deviating from the scope of the appended claims.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An apparatus comprising at least one processor and at least one memory including computer program code, the at least one memory and the computer program code configured to, with the at least one processor, cause the apparatus to at least perform:
   receiving an authentication request related to authentication of a user of an electronic device towards an apparatus;
   obtaining a first information, wherein the obtained first information is usable for checking or causing checking of an integrity of the electronic device and/or at least one application of the electronic device;
   checking or causing checking of the integrity of the electronic device and/or of the integrity of the at least one application of the electronic device,
   wherein the obtaining of the first information is performed prior to the checking or causing checking of the integrity, wherein the first information comprises a result of a validity check and/or information on a time when the validity check was performed,
   wherein the first information is used as a reference in the checking of the integrity of the electronic device and/or of the integrity of the at least one application of the electronic device;
   performing or causing authentication of the user of the electronic device; and
   returning or causing returning of authentication information towards the server of the service provider;
   wherein at least a part of the authentication information and/or the returning of at least a part of the authentication information is indicative of the user having been authenticated by the authentication, and
   wherein at least a part of the authentication information and/or the returning of at least a part of the authentication information represents that the electronic device and/or the at least one application has/have been considered integer by the checking.

2. The apparatus according to claim 1, wherein the performing or causing authentication further comprises:
   sending or causing sending an authentication request towards an authentication server; and
   receiving response information, wherein at least a part of the response information is indicative of the user having been authenticated by the authentication server.

3. The apparatus according to claim 2, the at least one memory and the computer program code configured to, with the at least one processor, cause the apparatus further to perform:
  relaying information related to the authentication of the user between the authentication server and the electronic device.

4. The apparatus according to claim 2, wherein in the authentication, one or more credentials are provided to the authentication server without being relayed via the apparatus.

5. The apparatus according to claim 1, wherein the authentication of the user of the electronic device is performed based on information resulting from a previous authentication of the user and obtained from an authentication server that was involved in the previous authentication of the user.

6. An apparatus comprising at least one processor and at least one memory including computer program code, the at least one memory and the computer program code configured to, with the at least one processor, cause the apparatus to at least perform:
  receiving a service request from an electronic device;
  receiving first information, wherein the first information is useable by an apparatus for checking the integrity of the electronic device and/or of at least one application of the electronic device, wherein the first information comprises a result of a validity check and/or information on a time when the validity check was performed, wherein the first information is used as a reference in the checking of the integrity of the electronic device and/or of the integrity of the at least one application of the electronic device;
  sending or causing sending of an authentication request to the apparatus to at least cause authentication of a user of the electronic device; and
  receiving authentication information,
  wherein at least a part of the authentication information is indicative of the user having been authenticated and
  wherein at least a part of the authentication information and/or the returning of at least a part of the authentication information represents that the electronic device and/or the at least one application of the electronic device are considered integer by the apparatus.

7. The apparatus according to claim 6, wherein the returning of the part of the authentication information that is indicative of the user having been authenticated represents that the electronic device and/or the at least one application of the electronic device is/are considered integer by the apparatus, the at least one memory and the computer program code configured to, with the at least one processor, cause the apparatus further to perform:
  checking the received authentication information to determine whether the user has been authenticated, and
  granting access to a service requested by the service request only if it is determined that the user has been authenticated.

8. The apparatus according to claim 6, wherein the first information is contained in or provided together with the authentication request.

9. An apparatus comprising at least one processor and at least one memory including computer program code, the at least one memory and the computer program code configured to, with the at least one processor, cause the apparatus to at least perform:
  obtaining a first information useable for checking an integrity of an electronic device and/or an integrity of at least one application of the electronic device, wherein the first information is obtained upon startup of the at least one application of the electronic device from a security management server;
  sending a service request to an apparatus;
  including the obtained first information in the service request or providing the first information together with the service request, wherein the first information comprises a result of a validity check and/or information on a time when the validity check was performed, wherein the first information is used as a reference in the checking of the integrity of the electronic device and/or of the integrity of the at least one application of the electronic device;
  providing information related to the integrity of the electronic device and/or to the integrity of the at least one application of the electronic device; and
  providing information related to an identity of a user of the electronic device,
  wherein the information related to the integrity of the electronic device and/or to the integrity of the at least one application of the electronic device is provided in or together with the service request, or
  wherein the information related to the integrity of the electronic device and/or to the integrity of the at least one application of the electronic device is provided upon request after sending the service request.

10. The apparatus according to claim 9, the at least one memory and the computer program code configured to, with the at least one processor, cause the apparatus further to perform:
  using a service of the service provider as requested by the service request in case the service provider grants the service request.

11. The apparatus according to claim 9, wherein the apparatus is the electronic device or a part thereof.

12. A method, comprising:
  receiving an authentication request related to authentication of a user of an electronic device towards an apparatus;
  obtaining a first information, wherein the obtained first information is usable for checking or causing checking of an integrity of the electronic device and/or at least one application of the electronic device;
  checking or causing checking of the integrity of the electronic device and/or of the integrity of the at least one application of the electronic device,
  wherein the obtaining of the first information is performed prior to the checking or causing checking of the integrity, wherein the first information comprises a result of a validity check and/or information on a time when the validity check was performed,
  wherein the first information is used as a reference in the checking of the integrity of the electronic device and/or of the integrity of the at least one application of the electronic device;
  performing or causing authentication of the user of the electronic device; and
  returning or causing returning of authentication information towards the server of the service provider;
  wherein at least a part of the authentication information and/or the returning of at least a part of the authentication information is indicative of the user having been authenticated by the authentication, and
  wherein at least a part of the authentication information and/or the returning of at least a part of the authentication information represents that the electronic device and/or the at least one application has/have been considered integer by the checking.

13. The method according to claim 12, the performing or causing authentication further comprising:
sending or causing sending an authentication request towards an authentication server; and
receiving response information, wherein at least a part of the response information is indicative of the user having been authenticated by the authentication server.

14. The method of claim 13, further comprising:
relaying information related to the authentication of the user between the authentication server and the electronic device.

15. The method of claim 13, wherein the method is performed by an identity provider server, wherein in the authentication, one or more credentials are provided to the authentication server without being relayed via the identity provider server.

16. The method according to claim 12, wherein the authentication of the user of the electronic device is performed based on information resulting from a previous authentication of the user and obtained from an authentication server that was involved in the previous authentication of the user.

17. A method, comprising:
receiving a service request from an electronic device;
receiving first information, wherein the first information is useable by an apparatus for checking the integrity of the electronic device and/or of at least one application of the electronic device, wherein the first information comprises a result of a validity check and/or information on a time when the validity check was performed, wherein the first information is used as a reference in the checking of the integrity of the electronic device and/or of the integrity of the at least one application of the electronic device;
sending or causing sending of an authentication request to the apparatus to at least cause authentication of a user of the electronic device; and
receiving authentication information,
wherein at least a part of the authentication information is indicative of the user having been authenticated and
wherein at least a part of the authentication information and/or the returning of at least a part of the authentication information represents that the electronic device and/or the at least one application of the electronic device are considered integer by the apparatus.

18. The method according to claim 17, wherein the returning of the part of the authentication information that is indicative of the user having been authenticated represents that the electronic device and/or the at least one application of the electronic device is/are considered integer by the apparatus, the method further comprising:
checking the received authentication information to determine whether the user has been authenticated, and
granting access to a service requested by the service request only if it is determined that the user has been authenticated.

19. The method according to claim 17, wherein the first information is contained in or provided together with the authentication request.

20. A method, comprising:
obtaining a first information useable for checking an integrity of an electronic device and/or an integrity of at least one application of the electronic device, wherein the first information is obtained upon startup of the at least one application of the electronic device from a security management server;
sending a service request to an apparatus;
including the obtained first information in the service request or providing the first information together with the service request, wherein the first information comprises a result of a validity check and/or information on a time when the validity check was performed, wherein the first information is used as a reference in the checking of the integrity of the electronic device and/or of the integrity of the at least one application of the electronic device;
providing information related to the integrity of the electronic device and/or to the integrity of the at least one application of the electronic device; and
providing information related to an identity of a user of the electronic device,
wherein the information related to the integrity of the electronic device and/or to the integrity of the at least one application of the electronic device is provided in or together with the service request, or
wherein the information related to the integrity of the electronic device and/or to the integrity of the at least one application of the electronic device is provided upon request after sending the service request.

* * * * *